United States Patent
Shindo et al.

(10) Patent No.: US 10,211,462 B2
(45) Date of Patent: Feb. 19, 2019

(54) LITHIUM ION CELL

(71) Applicant: SANYO CHEMICAL INDUSTRIES, LTD., Kyoto-shi, Kyoto (JP)

(72) Inventors: Yasuhiro Shindo, Kyoto (JP); Yusuke Mizuno, Kyoto (JP); Kenichi Kawakita, Kyoto (JP); Yasuhiko Ohsawa, Yokohama (JP); Yuki Kusachi, Yokohama (JP); Hajime Satou, Yokohama (JP); Hiroshi Akama, Yokohama (JP); Hideaki Horie, Yokohama (JP)

(73) Assignee: SANYO CHEMICAL INDUSTRIES, LTD., Kyota (JP)

( * ) Notice: Subject to any disclaimer, the term of this patent is extended or adjusted under 35 U.S.C. 154(b) by 69 days.

(21) Appl. No.: 15/426,695

(22) Filed: Feb. 7, 2017

(65) Prior Publication Data
US 2017/0237116 A1    Aug. 17, 2017

Related U.S. Application Data

(60) Provisional application No. 62/294,814, filed on Feb. 12, 2016.

(51) Int. Cl.
*H01M 4/04* (2006.01)
*H01M 10/04* (2006.01)
(Continued)

(52) U.S. Cl.
CPC ......... *H01M 4/624* (2013.01); *H01M 2/0275* (2013.01); *H01M 4/366* (2013.01);
(Continued)

(58) Field of Classification Search
CPC ........ H01M 4/624; H01M 4/66; H01M 4/366; H01M 10/052; H01M 2/0275;
(Continued)

(56) References Cited

U.S. PATENT DOCUMENTS 5,437,943 A * 8/1995 Fujii ................ H01M 4/36
429/213
2001/0033974 A1* 10/2001 Gavelin ............ H01M 10/052
429/306
(Continued)

FOREIGN PATENT DOCUMENTS

| | | |
|---|---|---|
| JP | 2004-158306 A | 6/2004 |
| JP | 2013-048041 A | 3/2013 |
| WO | 2014/208675 A1 | 12/2014 |

*Primary Examiner* — Lisa S Park
(74) *Attorney, Agent, or Firm* — Oliff PLC

(57) ABSTRACT

Provided is a lithium ion cell having a power generation part provided with a single cell obtained by stacking a positive electrode current collector, a positive electrode active material layer, a separator, a negative electrode active material layer, and a negative electrode current collector in the order, and an exterior cell container for accommodating the power generation part, in which the positive electrode active material layer is a non-bound material of a positive electrode active material particle, the negative electrode active material layer is a non-bound material of a negative electrode active material particle, and the single cell has flexibility.

11 Claims, 25 Drawing Sheets

(51) Int. Cl.
*H01M 4/62* (2006.01)
*H01M 2/02* (2006.01)
*H01M 4/36* (2006.01)
*H01M 4/66* (2006.01)
*H01M 10/052* (2010.01)
*H01M 4/02* (2006.01)

(52) U.S. Cl.
CPC ........... *H01M 4/66* (2013.01); *H01M 10/052* (2013.01); *H01M 2004/027* (2013.01); *H01M 2004/028* (2013.01); *H01M 2220/20* (2013.01)

(58) Field of Classification Search
CPC ....... H01M 2220/20; H01M 2004/028; H01M 2004/027
See application file for complete search history.

(56) References Cited

U.S. PATENT DOCUMENTS

| | | | |
|---|---|---|---|
| 2008/0003505 A1* | 1/2008 | Wuensch | B25F 5/02 429/303 |
| 2008/0206639 A1* | 8/2008 | Kurihara | H01M 4/0402 429/209 |
| 2011/0065000 A1* | 3/2011 | Chang | H01M 4/131 429/212 |
| 2013/0029205 A1* | 1/2013 | Adams | B32B 27/08 429/160 |
| 2013/0189565 A1* | 7/2013 | Lashmore | H01M 4/366 429/163 |
| 2015/0086860 A1* | 3/2015 | Yokoi | H01M 4/133 429/188 |
| 2016/0164098 A1 | 6/2016 | Ozeki et al. | |

* cited by examiner

LITHIUM ION CELL

BACKGROUND

Technical Field

The present invention relates to a lithium ion cell. More specifically, the present invention relates to a lithium ion cell having a power generation part provided with a single cell obtained by stacking a positive electrode current collector, a positive electrode active material layer, a separator, a negative electrode active material layer, and a negative electrode current collector in the order, in which the single cell has flexibility.

Related Arts

The lithium ion cell is a small-sized and light-weighted secondary cell having large capacity, and it is recently used for various applications. In accordance with a trend of having a smaller size or better performance of an electronic device in which a lithium ion cell is used as a power source, currently there is a demand for having a lithium ion cell with flexibility and large capacity.

As a cell with flexibility, a thin film type cell using a specific film exterior body (JP 2013-48041 A) and a lithium ion cell using a softening agent in an active material layer (WO 2014/208675 A) are known.

Furthermore, as a cell capable of exhibiting high power density, a stack type bipolar cell having a cell element, in which a single cell layer obtained by stacking a positive electrode current collector, a positive electrode active material layer, an electrolyte layer, a negative electrode active material layer, and a negative electrode current collector in the order is stacked serially, an exterior material for wrapping and sealing the entire cell element, and an electrode terminal drawn from the exterior material to the outside for drawing electric current is known (JP 2004-158306 A).

The bipolar cell means a cell in which a plurality of single cells are stacked and connected serially, and it has a structure in which the positive electrode current collector and negative electrode current collector are stacked either directly or via other member while they are in a state of maintaining electric connectivity. Since the electric current flows in the thickness direction, the bipolar cell has a short current path. Accordingly, the loss of electric current is small and a decrease in power is low, and thus it is possible to increase the power density, and when the amount of an active material contained in a cell is increased by increasing the stacking number of a single cell, it is also possible to achieve large capacity.

However, according to a cell with flexibility of a related art described in the above, the active material layer has flexibility, and thus there is a possibility that, when the lithium ion cell is significantly deformed, gaps or the like may occur within the active material layer and sufficient charge and discharge characteristics may not be exhibited as the conductive path is blocked.

Furthermore, for having large capacity, it is efficient to increase the amount of an electrode active material. However, according to the techniques of a related art, it is necessary to prepare a lithium ion cell in a thin film form to maintain the flexibility so that it is difficult to increase the amount of an electrode active material which can be used, that is, a thick electrode active material layer cannot be formed, and thus it is difficult to have large capacity while maintaining the flexibility.

Furthermore, as the stack type bipolar cell of a related art described above has insufficient active material layer flexibility, there is a possibility that, when a stress is applied to a main body of cell, defects like gap may occur due to a deformation occurring within the active material layer and sufficient charge and discharge characteristics may not be exhibited as the conductive path is blocked, and thus it is difficult to have simultaneously the cell characteristics such as high power density or large capacity and the mechanical durability.

The present invention is devised in view of the problems described above, and one object of the invention is to provide a lithium ion cell capable of having both the flexibility and large capacity so that sufficient charge and discharge characteristics can be exhibited even when the lithium ion cell is significantly deformed, and also to provide a stack type lithium ion cell capable of having both the cell characteristics such as high power density or large capacity and the mechanical durability.

SUMMARY

The present invention is applied to a lithium ion cell having a power generation part provided with a single cell in which a positive electrode current collector, a positive electrode active material layer, a separator, a negative electrode active material layer, and a negative electrode current collector are stacked in the order, and an exterior cell container for accommodating the power generation part. Furthermore, as the positive electrode active material layer is a non-bound material of a positive electrode active material particle, the negative electrode active material layer is a non-bound material of a negative electrode active material particle, and the single cell has flexibility, at least one of the aforementioned problems can be solved.

DETAILED DESCRIPTION

Figure 1:
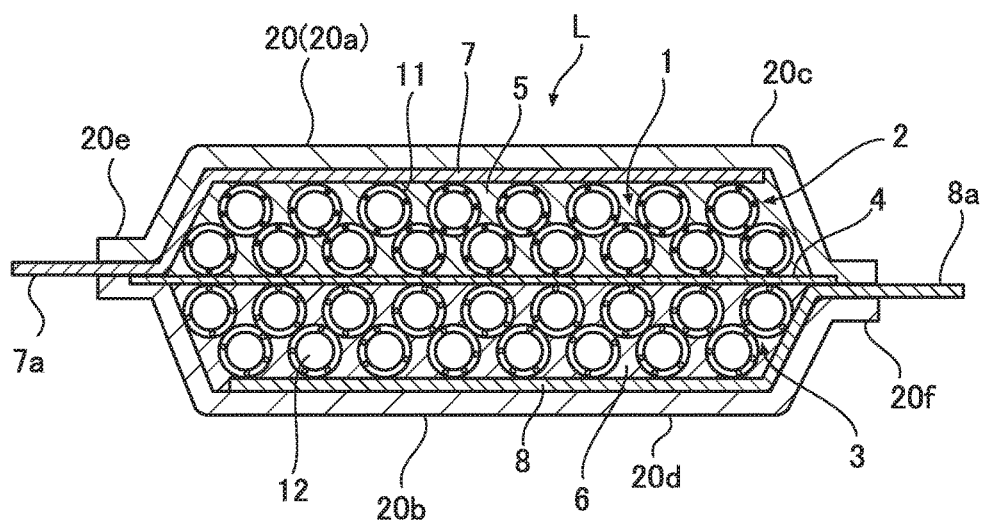
FIG. 1 is a cross-sectional view illustrating, among lithium ion cells of the present invention, a lithium ion cell according to a first embodiment.
Figure 2:
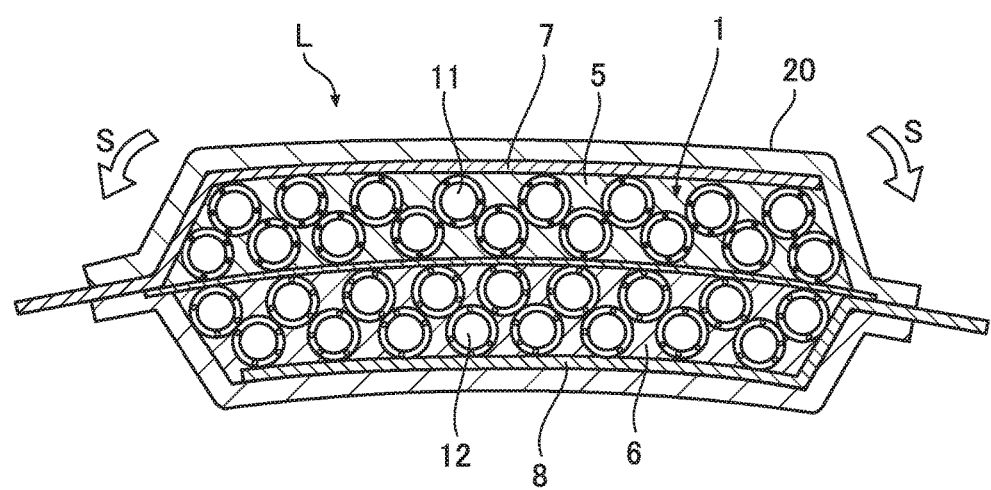
FIG. 2 is a cross-sectional view for describing the operation of the lithium ion cell according to the first embodiment.
Figure 3A:
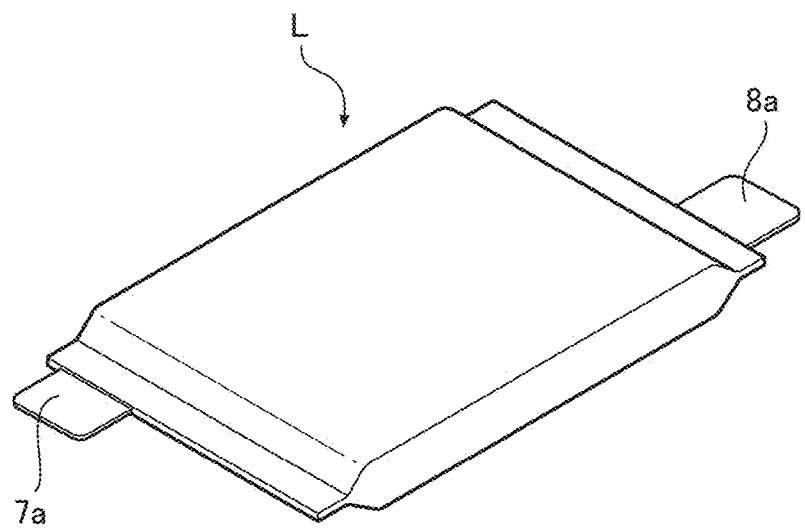
FIG. 3A is a perspective view of the lithium ion cell according to the first embodiment.
Figure 3B:
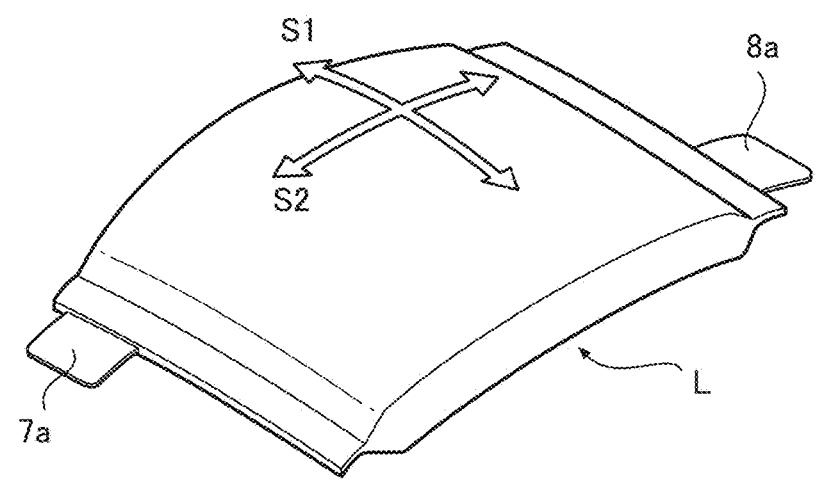
FIG. 3B is a perspective view for describing the operation of the lithium ion cell according to the first embodiment.

In view of FIGS. 1, 2, 3A and 3B, the first embodiment of the lithium ion cell of the present invention is described. FIG. 1 is a cross-sectional view illustrating, among the lithium ion cells of the present invention, the lithium ion cell of the first embodiment, FIG. 2 is a cross-sectional view for describing the operation of the lithium ion cell of the first embodiment, FIG. 3A is a perspective view of the lithium ion cell of the first embodiment, and FIG. 3B is a perspective view for describing the operation of the lithium ion cell of the first embodiment.

In the lithium ion cell of the present invention, an exterior cell container 20 (hereinbelow, it may be simply referred to as a container 20) of the lithium ion cell L as the first embodiment has a constitution in which a divided structure is formed by a top container 20a and a bottom container 20b, which are respectively obtained by forming a sheet shape member into a predetermined shape as illustrated in detail in FIGS. 1 and 3A. The top container 20a and the bottom container 20b are formed to have approximately the same shape, and they are provided with a top container main body 20c and a bottom container main body 20d which have an opening on one surface and a pair of a top container edge part 20e and a bottom container edge part 20f which protrude, from an end part on the right side and the left side of the top container main body 20c and the bottom container main body 20d in FIG. 1, to the lateral side. In the container 20, a lithium secondary single cell (hereinbelow, it may be also simply referred to as a "single cell") 1 for constituting the power generation part of the lithium ion cell L is accommodated.

On an inner surface of the top container 20a and the bottom container 20b (bottom surface of the top container 20a and top surface of the bottom container 20b in FIG. 1), that is, on an inner surface of the container 20, a positive electrode current collector 7 and a negative electrode current collector 8, both of which are resin current collectors having an electrically conductive resin layer are disposed, respectively. Furthermore, one end part of the positive electrode current collector 7 and one end part of the negative electrode current collector 8, specifically, the left end part of the positive electrode current collector 7 and the right end part of the negative electrode current collector 8 in FIG. 1, protrude from the edge part of the container 20 to the outside (in FIG. 1, toward left outside of the positive electrode current collector 7 or toward right outside of the negative electrode current collector 8), and those protrusions are referred to as electrode terminal 7a and 8a, respectively.

Furthermore, each of those two electrode terminals may be formed of a current collecting member which is different from the positive electrode current collector 7 and the negative electrode current collector 8.

In the case of using the current collecting member 13 and 14, the positive electrode current collector 7 and the negative electrode current collector 8 may have an approximately rectangular-parallelepiped shape with no protrusion [in FIG. 1, the left end part of the positive electrode current collector 7 (electrode terminal 7a) and the right end part of the negative electrode current collector 8 (electrode terminal 8a)]. The current collecting member 13 and 14 are preferably disposed such that they are electrically connected to the positive electrode current collector 7 and the negative electrode current collector 8, respectively, between the inner surface of the top container 20a and the positive electrode current collector 7 and the inner surface of the bottom container 20b and the negative electrode current collector 8.

Figure 6:
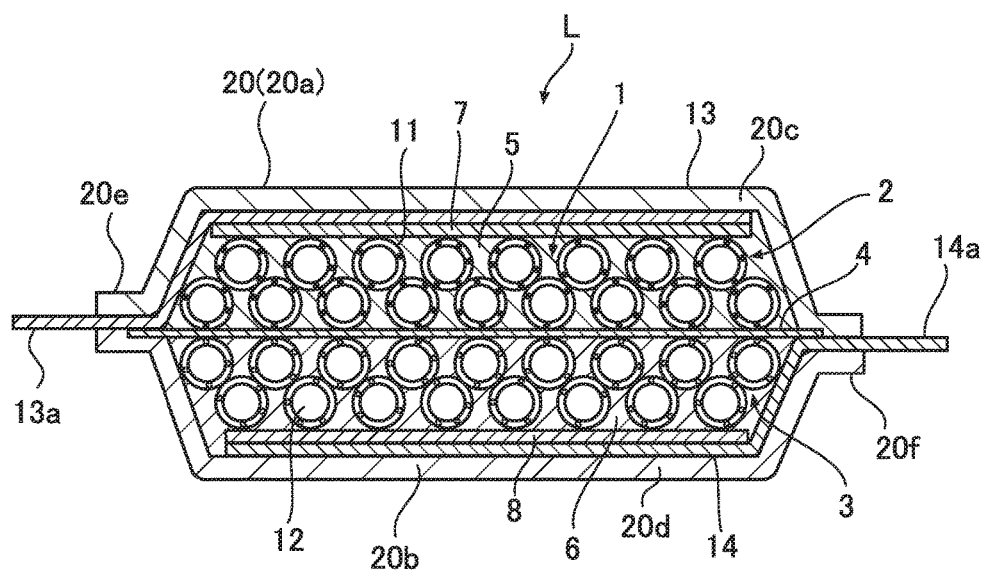
FIG. 6 is a cross-sectional view of a lithium ion cell as a variation example of the lithium ion cell according to the first embodiment.

In the lithium ion cell L according to the embodiment illustrated in FIG. 6, between the single cell 1 constituting the power generation part and the top container 20a or the bottom container 20b, the current collecting member 13 and 14 are disposed, respectively, and each of 13a and 14a, which are a part of the current collecting member 13 and 14, are extended to the outside of the lithium ion cell L through a top container edge part 20e and a bottom container edge part 20f, and they are referred to as electrode terminal 13a and 14a, respectively.

Between the top container 20a and the bottom container 20b of the lithium ion cell L as the first embodiment illustrated in FIGS. 1 and 6, a separator 4 with approximately flat plate shape is disposed so that the hollow space between the top container 20a and the bottom container 20b is divided into a positive electrode chamber 2 and a negative electrode chamber 3, respectively. Furthermore, the positive electrode chamber 2 and the negative electrode chamber 3 are filled with the positive electrode active material layer 5 and the negative electrode active material layer 6, respectively, and as a gap between the top container edge part 20e and the bottom container edge part 20f of the container 20 is sealed by a sealing member (not illustrated), the lithium ion cell L of this embodiment is formed. Thus, according to the lithium ion cell of the first embodiment, the single cell 1 constituting the power generation part is formed as the positive electrode current collector 7, the positive electrode active material layer 5, the separator 4, the negative electrode active material layer 6, and the negative electrode current collector 8 are stacked in the order.

In the specification, the expression "filling" means a state in which the positive electrode active material layer 5 containing the positive electrode active material particle 11 is accommodated in the positive electrode chamber 2 while the negative electrode active material layer 6 containing the negative electrode active material particle 12 is accommodated in the negative electrode chamber 3. Preferably, it represents a state in which the positive electrode active material particle 11 and an electrolyte solution are contained in the positive electrode chamber 2 while the negative electrode active material particle 12 and an electrolyte solution are contained in the negative electrode chamber 3. It is preferable to have a state in which each of the positive electrode active material particle 11 and the negative electrode active material particle 12 is mixed with an electrolyte solution.

The positive electrode active material layer 5 is a non-bound material containing the positive electrode active material particle 11 and the negative electrode active material layer 6 is a non-bound material containing the negative electrode active material particle 12.

To maintain an electrically conductive network in an active material layer, a positive electrode active material layer and a negative electrode active material layer of an already known lithium ion cell form a "bound material" in which an active material, a conductive aid or the like are bind to each other using a binder.

In the specification, the "non-bound material" means that the active materials are not bound to each other with a binder. In other words, it indicates a state in which each of the positive electrode active material particle 11 and the negative electrode active material particle 12 contained in the positive electrode active material layer 5 or the negative electrode active material layer 6 can move in response to an external force, and, as a non-bound, the positive electrode active material layer 5 and the negative electrode active material layer 6 can be freely deformed in response to an external force. Since the positive electrode active material particle 11 and the negative electrode active material particle 12, which are contained in the positive electrode active material layer 5 and the negative electrode active material layer 6, respectively, can move following a deformation of the positive electrode active material layer 5 and the negative electrode active material layer 6, it is not likely that the electric connection with neighboring positive electrode active material particle 11 and negative electrode active material particle 12 is disconnected. Accordingly, the conductive path can be maintained and the charge and discharge characteristics can be exhibited even when the lithium ion cell L undergoes a significant deformation.

It is preferable that the positive electrode active material layer 5 and the negative electrode active material layer 6 as a non-bound material have a form with fluidity. The form with fluidity refers to a form that, when an external force is applied, active material particles are moved and the entire shape is freely changed, such as a powder form, a slurry form, and a suspension liquid form. When each of the positive electrode active material particle 11 and the negative electrode active material particle 12 is admixed with an electrolyte solution, the resulting form may be a gel form, a slurry form, a powder form, a form close to these forms, or the like, depending on the weight ratio for mixing.

In the present invention, to have a state in which the positive electrode chamber 2 and the negative electrode chamber 3 are filled with the positive electrode active material layer 5 and the negative electrode active material layer 6, respectively, it is possible that each of the positive electrode active material layer 5 and the negative electrode active material layer 6, which are obtained by molding a positive electrode composition or a negative electrode composition after mixing active material particles (the positive electrode active material particle 11 or the negative electrode active material particle 12) with an electrolyte solution into a sheet shape, is disposed separately in the positive electrode chamber 2 and the negative electrode chamber 3, respectively, the positive electrode composition or the negative electrode composition is directly added to the positive electrode chamber 2 or the negative electrode chamber 3, or the positive electrode active material particle 11 or the negative electrode active material particle 12 having a powder form is directly added to each of the positive electrode chamber 2 and the negative electrode chamber 3, respectively.

When the positive electrode active material particle 11 or the negative electrode active material particle 12 having a powder form is directly added to each of the positive electrode chamber 2 and the negative electrode chamber 3, an electrolyte solution is preferably added thereafter.

When the positive electrode composition and negative electrode composition are made into a positive electrode active material layer 5 and a negative electrode active material layer 6, each of the positive electrode composition and negative electrode composition is coated to have predetermined thickness on a substrate having a sheet shape without using any binder, and a non-aqueous solvent is removed, to thereby obtain a positive electrode active material layer 5 and a negative electrode active material layer 6 while the active materials are not bound to each other.

When the positive electrode chamber 2 or the negative electrode chamber 3 is added with a positive electrode composition or a negative electrode composition, or with the positive electrode active material particle 11 or the negative electrode active material particle 12 having a powder form, by applying vibration or impact to the container 20, the positive electrode active material particle 11 and the negative electrode active material particle 12 can be evenly filled in the positive electrode chamber 2 and the negative electrode chamber 3, and therefore desirable.

The positive electrode composition is composed of the positive electrode active material particle 11, and examples of the positive electrode active material particle 11 include a composite oxide of lithium and a transition metal (for example, $LiCoO_2$, $LiNiO_2$, $LiMnO_2$, $LiMn_2O_4$, and $LiNi_{0.8}Co_{0.15}Al_{0.05}O_2$), an oxide of a transition metal (for example, $MnO_2$ and $V_2O_5$), a sulfide of a transition metal (for example, $MoS_2$ and $TiS_2$), and an electrically conductive polymer (for example, polyaniline, polypyrrole, polythiophene, polyacetylene, poly-p-phenylene, and polycarbazole). The volume average particle diameter of the positive electrode active material is preferably 0.1 to 100 µm, more preferably 1 to 50 µm, and particularly preferably 2 to 20 µm from the viewpoint of the electric characteristics of a cell.

The volume average particle diameter of the positive electrode active material means a particle diameter at integrated value of 50% (Dv50) in particle size distribution obtained by laser diffraction/scattering method (also referred to as Microtrac method). The laser diffraction/scattering method is a method for obtaining particle size distribution using scattered light obtained by irradiating particles with laser. For the measurement of a volume average particle diameter, Microtrac manufactured by Nikkiso Co., Ltd. or the like may be used.

Furthermore, the negative electrode composition is composed of the negative electrode active material particle 12, and examples of the negative electrode active material particle 12 include graphite, non-graphatizable carbon, amorphous carbon, calcined product of a polymer compound (for example, phenol resin, furan resin, or the like which is calcined and carbonized), cokes (for example, pitch cokes, needle cokes, and petroleum oil cokes), carbon fiber, an electrically conductive polymer (for example, polyacetylene and polyquinoline), tin, silicon, metal alloy (for example, lithium-tin alloy, lithium-silicon alloy, lithium-aluminum alloy, and lithium-aluminum-manganese alloy), and a composite oxide of lithium and a transition metal (for example, $Li_4Ti_5O_{12}$). The volume average particle diameter of the negative electrode active material is preferably 0.01 to 100 μm, more preferably 0.1 to 20 μm, and particularly preferably 2 to 10 μm from the viewpoint of the electric characteristics of a cell.

The volume average particle diameter of the negative electrode active material can be obtained in the same manner as the positive electrode active material.

The positive electrode active material particle 11 and the negative electrode active material particle 12 are preferably a coated active material particle and a coated negative material particle, respectively, of which surface is at least partially coated with a coating layer composed of a coating agent containing a resin for coating. More preferably, the positive electrode active material particle 11 is a coated active material particle of which surface is at least partially coated with a coating layer composed of a coating agent containing a resin for coating and a conductive aid. The coated active material particle is preferable because each of the positive electrode active material layer 5 and the negative electrode active material layer 6 can have further improved flexibility. Further, the coated active material particle is preferable because an electrochemical reaction between an electrolyte solution and an active material occurring during charge and discharge can be suppressed, deterioration of an electrolyte solution can be inhibited, and the cycle characteristics are improved. In addition, the positive electrode active material particle 11 is preferably a coated positive electrode active material particle coated with a coating layer composed of a coating agent containing a resin for coating and a conductive aid, because electronic conductivity of the positive electrode active material layer 5 can be further improved. The coating layer for the coated negative electrode active material particle may or may not contain a conductive aid. In particular, when the negative electrode active material particle 12 is made of graphite, non-graphitizable carbon, amorphous carbon, burnt product of a polymer compound, cokes, or carbon fiber, the negative electrode active material layer 6 can have a preferable electronic conductivity even though the coating agent does not contain a conductive aid. However, a coating agent containing a conductive aid may be applied to adjust the electronic conductivity of the negative electrode active material layer 6.

In the present invention, the coating means a state in which at least part of the surface of an active material particle is adhered with a coating agent, and it also includes a state in which the surface of an active material particle is dotted over with a coating agent. The state in which the surface of an active material particle is adhered with a coating agent can be confirmed by observing an enlarged image of the coated active material particle using a scanning electron microscope or the like.

As the coating agent contains a resin for coating, when the periphery of the positive electrode active material particle 11 and the negative electrode active material particle 12 is coated with a coating agent, a volume change of an electrode is alleviated so that the electrode expansion can be suppressed. As for the resin for coating, it is possible to use a resin which swells according to absorption of an electrolyte solution. Specific examples thereof include a vinyl resin, a urethane resin, a polyester resin, a polyamide resin, an epoxy resin, a polyimide resin, a silicone resin, a phenol resin, a melamine resin, a urea resin, an aniline resin, an ionomer resin, and polycarbonate. Among them, a vinyl resin is preferable.

The vinyl resin is a resin which contains the vinyl monomer (a) as an essential constitutional monomer, and it is preferably a resin having, as an essential constitutional monomer, the vinyl monomer (a1) with a carboxyl group or an acid anhydride group and the vinyl monomer (a2) represented by the following General Formula (1) as the vinyl monomer (a).

$$CH_2=C(R^1)COOR^2 \quad (1)$$

[in Formula (1), $R^1$ is a hydrogen atom or a methyl group and $R^2$ is a branched alkyl group with carbon atom number of 4 to 36.]

Examples of the vinyl monomer (a1) with a carboxyl group or an acid anhydride group include monocarboxylic acid containing vinyl group [(meth)acrylic acid, crotonic acid, cinnamic acid, or the like] and dicarboxylic acid containing vinyl group [maleic acid (anhydride), fumaric acid, itaconic acid (anhydride), citraconic acid, mesaconic acid or the like]. Among them, (meth)acrylic acid is preferable and methacrylic acid is more preferable. Furthermore, in the specification, (meth)acrylic acid means methacrylic acid and/or acrylic acid.

The vinyl monomer (a1) may be used as a salt of alkali metal (for example, sodium, lithium, or the like). When the vinyl monomer (a1) is used as a salt, a salt of the vinyl monomer (a1) may be polymerized or a resin may be neutralized to have a salt.

With regard to the vinyl monomer (a2) represented by the above General Formula (1), $R^1$ represents a hydrogen atom or a methyl group, and it is preferably a methyl group.

$R^2$ is a residue of branched alkyl alcohol with carbon atom number of 4 to 36 with exclusion of a hydroxyl group, and specific examples thereof include a sec-butyl group, a tert-butyl group, a 1-methylbutyl group, a 1-ethylpropyl group, a 1,1-dimethylpropyl group, a 1-methylpentyl group, a 1-ethylbutyl group, a 1-methylhexyl group, a 1-ethylpentyl group, a 1-methylheptyl group, a 1-ethylhexyl group, a 1-methyloctyl group, a 1-ethylheptyl group, a 1-methyl nonyl group, a 1-ethyloctyl group, a 1-methyldecyl group, a 1-ethyl nonyl group, a 1-butyl eicosyl group, a 1-hexyl octadecyl group, a 1-octylhexadecyl group, a 1-decyl tetradecyl group, a 1-undecyl tridecyl group, an iso-butyl group, a 2-methylbutyl group, a 2-ethylpropyl group, a 2,2-dimethylpropyl group, a 2-methylpentyl group, a 2-ethylbutyl group, a 2-methylhexyl group, a 2-ethylpentyl group, a 2-methylheptyl group, a 2-ethylhexyl group, a 2-methyloctyl group, a 2-ethylheptyl group, a 2-methyl nonyl group, a 2-ethyloctyl group, a 2-methyldecyl group, a 2-ethyl nonyl group, a 2-hexyloctadecyl group, a 2-octylhexadecyl group, a 2-decyltetradecyl group, a 2-undecyltridecyl group, a 2-dodecyl hexadecyl group, a 2-tridecylpentadecyl group, a 2-decyloctadecyl group, a 2-tetradecyloctadecyl group, a 2-hexadecyloctadecyl group, a 2-tetradecyleicosyl group, and a 2-hexadecyleicosyl group. Preferably, it is a 2-ethylhexyl group or a 2-decyl tetradecyl group.

As for the vinyl monomer (a2) represented by the General Formula (1), a vinyl monomer obtained by esterification of (meth)acrylic acid with branched alkyl alcohol having carbon atom number of 4 to 36 by a known method can be mentioned. It is preferably 2-ethylhexyl (meth)acrylic acid, and more preferably 2-ethylhexyl methacrylic acid.

Furthermore, as a constitutional monomer of the vinyl resin, a copolymerizable vinyl monomer (a3) may be contained other than the vinyl monomer (a1) with a carboxyl group or an acid anhydride group and the vinyl monomer (a2) represented by the above General Formula (1).

Examples of the copolymerizable vinyl monomer (a3) not containing an active hydrogen include the following (a31) to (a38).

(a31) Ester of monoalcohol with carbon atom number of 1 to 18 with (meth)acrylic acid: methyl (meth)acrylate, ethyl (meth)acrylate, decyl (meth)acrylate, stearyl (meth)acrylate, cyclohexyl (meth)acrylate and benzyl (meth)acrylate or the like.

(a32) Ester of poly (n=2 to 30) oxyalkylene (carbon atom number of 2 to 4) alkyl (carbon atom number of 1 to 18) ether with (meth)acrylate: ester of monomethyl ether as 10 mol ethylene oxide adduct of methanol with (meth)acrylic acid and ester of monomethyl ether as 10 mol propylene oxide adduct with (meth)acrylic acid or the like.

(a33) Vinyl compound containing nitrogen element: N,N-dimethyl acrylamide, N,N-dibenzyl acrylamide, N-vinylpyrrolidone, N,N-dimethylaminoethyl (meth)acrylate, N,N-diethylaminoethyl (meth)acrylate, t-butylaminoethyl (meth)acrylate, morpholino ethyl (meth)acrylate, N-vinyl-2-pyrrolidone, and a quaternized product thereof.

(a34) Vinyl hydrocarbon: ethylene, propylene, butene, isobutylene, pentene, heptene, diisobutylene, octene, dodecene, octadecene, styrene, α-methylstyrene, vinyl toluene, 2,4-dimethyl styrene, ethyl styrene, isopropyl styrene, butyl styrene, phenyl styrene, cyclohexyl styrene and benzyl styrene or the like.

(a35) Vinyl ester: vinyl acetate, vinyl propionate, vinyl butyrate, diallyl adipate, isopropenyl acetate, vinylmethoxy acetate, vinyl benzoate, diallyl phthalate, methyl-4-vinyl benzoate, and acetoxy styrene or the like.

(a36) Vinyl ether: vinyl methyl ether, vinyl butyl ether, vinyl 2-ethylhexyl ether, vinyl-2-methoxyethyl ether, methoxy butadiene, vinyl-2-ethyl mercaptoethyl ether, diallyloxy ethane, triallyloxy ethane, tetraallyloxy butane, tetraallyloxy ethane, vinyl phenyl ether and phenoxy styrene or the like.

(a37) Vinylketone: vinyl methyl ketone, vinyl ethyl ketone and vinyl phenyl ketone or the like.

(a38) Vinyl sulfonic acid: vinyl sulfonic acid, styrene sulfonic acid and 2-acrylamide-2-methylpropane sulfonic acid, and an alkali metal salt thereof or the like.

Among those exemplified above as (a3), from the viewpoint of voltage resistance, preferred are (a31), (a32), (a33) and (a38). More preferred is (a31). Methyl (meth)acrylate, ethyl (meth)acrylate, and butyl (meth)acrylate are particularly preferable. In the specification, (meth)acrylate means methacrylate and/or acrylate.

Content of the vinyl monomer (a1) with a carboxyl group or an acid anhydride group, the vinyl monomer (a2) represented by the above General Formula (1), and the copolymerizable vinyl monomer (a3) is preferably as follows; 0.1 to 80% by weight for (a1), 0.1 to 99.9% by weight for (a2), and 0 to 99.8% by weight for (a3) based on the total weight of the constitutional monomer for polymer.

When content of the each is within the aforementioned range, favorable movement of the positive electrode active material particle 11 and the negative electrode active material particle 12 in the positive electrode active material layer 5 and the negative electrode active material layer 6 is obtained.

More preferable content is 15 to 60% by weight for (a1), 5 to 60% by weight for (a2), and 5 to 80% by weight for (a3). Even more preferable content is 25 to 50% by weight for (a1), 15 to 45% by weight for (a2), and 20 to 60% by weight for (a3).

When a vinyl resin is used as a resin for coating, the lower limit of number average molecular weight of the vinyl resin is preferably 3,000, more preferably 50,000, even more preferably 100,000, and particularly preferably 200,000. The upper limit is preferably 2,000,000, more preferably 1,500,000, even more preferably 1,000,000, and particularly preferably 800,000. The number average molecular weight can be obtained by a gel permeation chromatography measurement (hereinbelow, abbreviated as GPC) at the following conditions.

Apparatus: Alliance GPC V2000 (manufactured by Waters)
Solvent: Orthodichlorobenzene
Reference material: Polystyrene
Detector: RI
Sample concentration: 3 mg/ml
Column stationary phase: PLgel 10 μm, MIXED-B, two columns are connected in series (manufactured by Polymer Laboratories)
Column temperature: 135° C.

The vinyl resin used as a resin for coating can be produced by a known polymerization method using a monomer (for example, bulk polymerization, solution polymerization, emulsion polymerization, and suspension polymerization).

The polymerization may be performed by using a known polymerization initiator {azo-based initiator [2,2'-azobis(2-methylpropionitrile), 2,2'-azobis(2,4-dimethylvaleronitrile, or the like)], peroxide-based initiator (benzoyl peroxide, di-t-butylperoxide, lauryl peroxide, or the like) or the like}.

Use amount of the polymerization initiator is preferably 0.01 to 5% by weight based on the total weight of the constitutional monomers.

Examples of the solvent used for solution polymerization include ester (for example, ester with carbon atom number of 2 to 8 such as ethyl acetate or butyl acetate), alcohol (for example, alcohol with carbon atom number of 1 to 8 such as methanol, ethanol, or octanol), hydrocarbon (for example, hydrocarbon with carbon atom number of 4 to 8 such as n-butane, cyclohexane, or toluene), and ketone (for example, ketone with carbon atom number of 3 to 9 such as methyl ethyl ketone). The use amount is, based on the total weight of the constitutional monomers, preferably 5 to 900%.

Examples of a dispersion medium used for emulsion polymerization and suspension polymerization include water, alcohol (for example, ethanol), ester (for example, ethyl propionate), and light naphtha. Examples of the emulsifying agent include a metal salt of higher fatty acid (carbon atom number of 10 to 24) (for example, sodium oleate and sodium stearate), sulfate ester metal salt of higher alcohol (carbon atom number of 10 to 24) (for example, sodium lauryl sulfate), ethoxylated tetramethyldecine diol, sodium sulfoethyl methacrylate, and methyl dimethylamino methacryalte. Furthermore, as a stabilizer, polyvinyl alcohol, polyvinylpyrrolidone, or the like may be added.

For solution polymerization, emulsion polymerization, and suspension polymerization, concentration of the constitutional monomer included in a solution or a dispersion solution is preferably 5 to 95% by weight.

For the polymerization, a known chain transfer agent like a mercapto compound (for example, dodecyl mercaptan and n-butyl mercaptan) and hydrocarbon halide (carbon tetrachloride, carbon tetrabromide, benzyl chloride or the like) may be used. The use amount is, based on the total weight of constitutional monomer, preferably 2% by weight or less.

Furthermore, for the polymerization reaction, the temperature inside the system is preferably −5 to 150° C., and the end point of the reaction can be determined by measuring the amount of unreacted monomers. Furthermore, the amount of unreacted monomer at the end point of the polymerization reaction is preferably 5% by weight or less based on the total weight of used constitutional monomer.

The conductive aid to be contained in the coating agent is selected from materials having electric conductivity.

Examples of the material having electric conductivity include a metal [aluminum, stainless (SUS), silver, gold, copper, and titanium], electrically conductive carbon [graphite, carbon black, acetylene black, Vulcan (registered trademark), Ketjen black (registered trademark), Black pearl (registered trademark), furnace black, channel black, heat transfer lamp black, carbon nanotube (monolayer carbon nanotube and multilayer carbon nanotube), carbon nanohorn, carbon nanobaloon, hard carbon, and fullerene], and a mixture thereof, but it is not limited to them.

The conductive aid may be used either singly or in combination of two or more types. Furthermore, an alloy or a metal oxide of them can be also used. From the viewpoint of electrical stability, it is preferably aluminum, stainless, carbon, silver, gold, copper, titanium or a mixture thereof. More preferably, it is silver, gold, aluminum, stainless, or carbon. Even more preferably, it is carbon. Furthermore, as a conductive aid, a non-electrically conductive material like particle based ceramic material and resin material which is coated with an electrically conductive material (the metal among the above conductive aid materials) by plating or the like, and a mixture of a non-electrically conductive material and an electrically conductive material (the metal among the above conductive aid materials) can be also used.

Shape of the conductive aid is not particularly limited, and those having a shape like globule shape, amorphous shape, fiber shape, single particle shape, aggregate shape, or a combination thereof can be used. In particular, from the electric conductivity or the like, it is preferably an aggregate of microparticle of which primary particle diameter is 5 to 50 nm. The shape of the conductive acid can be identified by measuring, using a scanning type electron microscope or the like, particles in a viewing field according to observation of an enlarged image of a conductive aid.

The weight ratio between the resin for coating and conductive aid, which are contained in the coating agent is preferably as follows—resin for coating:conductive aid=100:1 to 100:200. It is more preferably 100:5 to 100:100. As it is within this range, the positive electrode active material layer 5 and the negative electrode active material layer 6 can have favorable electric conductivity.

The coated active material particle can be obtained as follows: for example, in a state in which the positive electrode active material particle 11 or the negative electrode active material particle 12 is added to an universal mixer and stirred at 30 to 500 rpm, a resin solution, in which a resin for coating and a conductive aid used as necessary are dissolved and mixed in an organic solvent, is added dropwise over 1 to 90 minutes for mixing, followed by further mixing a conductive aid used as necessary, increasing the temperature to 50 to 200° C. in a stirring state, lowering the pressure to 0.007 to 0.04 MPa, and maintaining it for 10 to 150 minutes.

Ratio of the resin for coating which is contained in the resin solution is preferably 10 to 50% by weight based on the weight of the resin solution. As for the organic solvent used for the resin solution, an organic solvent capable of dissolving the resin for coating can be used.

Obtainment of the coated active material particle can be confirmed by observing an enlarged image of the coated active material particle obtained by using a scanning electron microscope or the like.

When each of the positive electrode composition and negative electrode composition is filled in the positive electrode chamber 2 and the negative electrode chamber 3, respectively, the positive electrode composition and negative electrode composition are preferably a mixture obtained by mixing each of the positive electrode active material particle 11 and the negative electrode active material particle 12 with an electrolyte solution or a non-aqueous solvent, and it is preferably a slurry-like mixture. In that case, the amount of the positive electrode active material particle 11 and the negative electrode active material particle 12 which are contained in the positive electrode composition and the negative electrode composition, respectively, is preferably 10 to 60% by weight based on the weight of the electrolyte solution or non-aqueous solvent.

As for the electrolyte solution, a known electrolyte solution containing an electrolyte and a non-aqueous solvent used for production of a known lithium ion cell can be used.

As for the electrolyte, those used for known electrolyte solutions can be used. Examples thereof include a lithium salt of an inorganic acid such as $LiPF_6$, $LiBF_4$, $LiSbF_6$, $LiAsF_6$ or $LiClO_4$ and a lithium salt of an organic acid such as $LiN(CF_3SO_2)_2$, $LiN(C_2F_5SO_2)_2$ or $LiC(CF_3SO_2)_3$. The electrolyte may be used either singly or in combination of two or more types. In particular, $LiPF_6$ is preferable from the viewpoint of battery power and charge and discharge cycle characteristics.

As for the non-aqueous solvent, those used for known electrolyte solutions can be used. For example, lactone, cyclic or chain type carbonate ester, chain type carboxylic acid ester, cyclic or chain type ether, phosphoric acid ester, nitrile compound, amide compound, sulfone, sulfolane, and a mixture thereof can be used. The non-aqueous solvent may be used either singly or in combination of two or more types.

From the viewpoint of the cell power and charge and discharge cycle characteristics, those preferred among the above non-aqueous solvents are lactone, cyclic type carbonate ester, chain type carbonate ester, and phosphoric acid ester. More preferred are lactone, cyclic type carbonate ester, and chain type carbonate ester. Even more preferred are cyclic type carbonate ester, and a mixture of cyclic type carbonate ester and chain type carbonate ester. Particularly preferred are propylene carbonate (PC), a mixture of propylene carbonate (PC) with ethylene carbonate (EC), and a mixture of ethylene carbonate (EC) with diethyl carbonate (DEC).

Concentration of an electrolyte contained in the electrolyte solution is preferably 0.1 to 3 mol/L, and more preferably 0.5 to 2 mol/L based on the volume of the electrolyte solution.

In the present invention, from the viewpoint of reducing the ion resistance or the like, each of the positive electrode active material layer 5 and the negative electrode active material layer 6 preferably contains a fibrous electrically conductive filler together with the aforementioned coated active material particle. Examples of the fibrous electrically conductive filler include carbon fiber such as PAN based carbon fiber or pitch based carbon fiber, electrically conductive fiber obtained by dispersing evenly a metal with good electric conductivity or graphite in synthetic fiber, metal fiber in which metal like stainless steel is formed into fiber, electrically conductive fiber obtained by coating a surface of organic fiber with metal, and electrically conductive fiber obtained by coating a surface of organic fiber with an electrically conductive resin layer. Among those electrically conductive fibers, the carbon fiber is preferable.

From the viewpoint of the ion resistance and strength of an active material layer or the like, average fiber length of the fibrous electrically conductive filler is preferably 100 to 1000 μm. It is more preferably 110 μm to 600 μm and particularly preferably 150 μm to 500 μm. The mean fiber diameter is preferably 0.1 to 100 μm, and more preferably 0.5 to 2.0 μm.

When a fibrous electrically conductive filler is contained in the positive electrode active material layer 5 and the negative electrode active material layer 6, ratio of the fibrous electrically conductive filler is, based on the weight of the coated active material particle, preferably 0.5 to 5% by weight.

When a fibrous electrically conductive filler is contained in the positive electrode active material layer 5 and the negative electrode active material layer 6, it is preferable that the positive electrode active material layer 5 and the negative electrode active material layer 6 are formed by filling each of the positive electrode chamber 2 and the negative electrode chamber 3 with a positive electrode composition which contains the positive electrode active material particle 11, a fibrous electrically conductive filler, and an electrolyte solution, and a negative electrode composition which contains the negative electrode active material particle 12, a fibrous electrically conductive filler, and an electrolyte solution, respectively.

Thickness of the positive electrode active material layer 5 and the negative electrode active material layer 6 is preferably 200 μm or more. It is more preferably 500 μm or more, and even more preferably 1000 μm or more. When it is the same or higher than this thickness, a cell having high amount of an active material per unit volume and high charge capacity can be yielded. Upper limit of the thickness of the positive electrode active material layer 5 and the negative electrode active material layer 6 can be adjusted in accordance with the charge capacity, and is preferably 3000 μm or less from the viewpoint of charge and discharge rate characteristics.

As the separator 4, a porous film of hydrocarbon resin like polyfluorovinylydene-hexafluoropropylene (PVdF-HFP) and polyolefin (polyethylene and polypropylene), a multilayer film of porous film (for example, a laminate with three-layer structure of PP/PE/PP), a non-woven fabric composed of synthetic fiber (polyester fiber and aramid fiber) and glass fiber, and a known separator for a lithium ion cell having ceramic particles such as silica, alumina, titania or the like adhered on a surface of them can be used.

Thickness of the separator 4 can be adjusted depending on the use of a lithium ion cell. However, for a use in an electronic device such as a portable device, it is preferably 5 to 100 μm in a monolayer or a multilayer. More preferably, it is 10 to 50 μm.

The pore diameter of the separator 4 composed of a porous film or a multilayer film thereof is preferably 1 μm at most. When a non-woven fabric is used, thickness of the separator 4 is preferably 5 to 200 μm, and particularly preferably 10 to 100 μm.

The positive electrode current collector 7 and the negative electrode current collector 8 are a metal current collector or a resin current collector, and for each of them, a known metal current collector, or a resin current collector described in JP 2012-150905 A and WO 2015/005116 A, or the like can be used.

As for the metal current collector, a metal current collector generally used for a lithium ion cell can be used, and examples thereof include a current collector composed of at least one metal selected from a group consisting of copper, aluminum, titanium, nickel, tantalum, niobium, hafnium, zirconium, zinc, tungsten, bismuth, and antimony, an alloy containing at least one of them, and a stainless alloy.

The shape a substrate of the metal current collector can be any one of a thin film shape, a metal foil shape, and a mesh shape, and a metal layer can be formed on a surface of a substrate of metal current collector by a method like sputtering, electrodepositon, and coating.

The resin current collector is a current collector formed of an electrically conductive polymer material or a polymer obtained by providing a non-electrically conductive polymer material with electric conductivity.

Examples of the electrically conductive polymer material include polyaniline, polypyrrole, polythiophene, polyacetylene, polyparaphenylene, polyphenylene vinylene, polyacrylonitrile, and polyoxadiazole. Furthermore, for the purpose of improving the electric conductivity of a resin current collector containing an electrically conductive polymer material, it is preferable that the below-mentioned electrically conductive filler is further contained.

Examples of the polymer material having no electric conductivity include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethyl acrylate (PMA), polymethyl methacrylate (PMMA), polyvinylidene fluoride (PVdF), an epoxy resin, a silicone resin, and a mixture thereof.

As for the polymer material having no electric conductivity, polyethylene (PE), polypropylene (PP), polymethylpentene (PMP), and polycycloolefin (PCO) are preferable from the viewpoint of the electric stability. More preferably, it is polyethylene (PE), polypropylene (PP), or polymethylpentene (PMP).

A polymer obtained by providing a polymer material having no electric conductivity with electric conductivity can be obtained by mixing a polymer material having no electric conductivity with an electrically conductive filler. The electrically conductive filler is selected from a filler obtained from a material with electric conductivity. Preferably, from the viewpoint of inhibiting ion penetration in a current collector, a filler obtained from a material having no electric conductivity for ion used as a charge transfer medium can be used. Specific examples thereof include a carbon material, aluminum, gold, silver, copper, iron, platinum, chrome, tin, indium, antimony, titanium, nickel, and an alloy material like stainless (SUS), but not limited thereto. In particular, from the viewpoint of corrosion resistance, a filler obtained from aluminum, stainless, a carbon material, or nickel is preferable. More preferably, it is a filler obtained from a carbon material. The electrically conductive filler may be used either singly or in combination of two or more types. The electrically conductive filler may be those obtained by coating a particle based ceramic material or a resin material with the aforementioned metal by plating or the like.

The shape of the electrically conductive filler may be any one of a particle shape, a fibrous shape, and an aggregate thereof.

The resin current collector can be obtained by a known method like those described in JP 2012-150905 A and WO 2015/005116 A. Specifically, those prepared by dispersing 5 to 20 parts of acetylene black as an electrically conductive filler in polypropylene and subjected to pressing by a heat press machine can be mentioned. Furthermore, thickness of the resin current collector is not particularly limited. It can be the thickness already known in the art or it can be applied after suitable modification.

For the positive electrode current collector 7 and the negative electrode current collector 8, a metal current collector or a resin current collector can be directly used, or those having an electrically conductive layer (described later) formed on the surface of the collector may be used. From the viewpoint of cell characteristics or the like, it is preferably a metal current collector or a resin current collector having an electrically conductive layer formed thereon.

As described above, the positive electrode current collector 7 and the negative electrode current collector 8 may have protrusions to become the electrode terminal 7a and 8a, and they may have an approximately rectangular shape with no protrusion.

In a case in which the positive electrode current collector 7 and the negative electrode current collector 8 having an approximately rectangular shape with no protrusion are used, it is preferable to have a current collecting member between the inner surface of the top container 20a and the positive electrode current collector 7 and the inner surface of the bottom container 20b and the negative electrode current collector 8 such that the current collecting member is electrically connected to each current collector.

The current collecting member preferably has an approximately flat plate shape with protrusions to become the electrode terminal 7a and 8a. An electrically conductive metal foil such as copper foil or aluminum foil can be used. As an electrically conductive metal foil, a surface-treated metal foil obtained by coating the surface with other electrically conductive material like carbon can be used. Shape of the protrusion is not limited as long as electric current can be drawn from the protrusion, and a copper wire or the like can be also used.

In a case in which a resin current collector is used as the positive electrode current collector 7 and the negative electrode current collector 8, the positive electrode current collector 7 and the negative electrode current collector 8 are preferably a resin current collector having an approximately rectangular shape with no protrusion, and it is preferable to use a current collecting member having an approximately flat plate shape which has protrusions to become the electrode terminal 7a and 8a.

The material constituting the sealing member is not particularly limited as long as it is a material having adhesive property for the positive electrode current collector 7 and the negative electrode current collector 8 and also having durability against an electrolyte solution. In particular, a polymer material is preferable and a thermosetting polymer material is more preferable. Examples thereof include an epoxy resin, a polyolefin resin, a polyurethane resin, and a polyvinylidene fluoride resin, and from the viewpoint of having high durability and easy handling, an epoxy resin is preferable.

As for the sealing member, those with double-sided tape shape with coating of plane-shaped surfaces with the aforementioned thermosetting resin in which a known sealing film or the like are used are preferable. As for the sealing film, a sealing film with three-layer structure (a film obtained by laminating a modified polypropylene film on top and bottom of a polyethylene naphthalate film) can be used. By heating and compressing using a known sealing device like impulse sealer, a sealing film can be sealed.

In the container 20 obtained by sealing the top container edge part 20e and the bottom container edge part 20f with a sealing member, the single cell 1 in which the positive electrode current collector 7, the positive electrode active material layer 5, the separator 4, the negative electrode active material layer 6, and the negative electrode current collector 8 are stacked in the order is accommodated as a power generation part, and the power generation part has flexibility.

Each of the positive electrode active material layer 5 and the negative electrode active material layer 6 is a non-bound material of active material particle, and since the positive electrode active material layer 5 and the negative electrode active material layer 6 can be freely deformed in response to an external force, by preparing a laminate in which the aforementioned positive electrode current collector 7, separator 4, and negative electrode current collector 8 are used, it is possible to have a power generation part having flexibility.

As for the container 20, any container 20 can be used if it is the container 20 composed of a material allowing stable accommodation of a positive electrode composition and a negative electrode composition inside the container 20. It is particularly preferable that the exterior cell container 20 has flexibility. Furthermore, considering the possibility of having a contact between the electrode composition and the container 20, the container 20 preferably consists of a material with insulating property. Considering that sealing (preferably, sealing under reduced pressure) is performed while a power generation part obtained by stacking in the order a positive electrode current collector, a positive electrode active material layer, a separator, a negative electrode active material, and a negative electrode current collector is accommodated in the container, it preferably consists of a material with airtight property.

As for the container 20, a container composed of a laminate film is preferable. Examples of the laminate film include a composite film having a metal layer interposed between an outer layer containing a heat resistant resin film and an inner layer containing a thermoplastic resin film. As for the heat resistant resin film, a stretched film of polyamide resin or polyester resin can be preferably used. As for the thermoplastic resin film, an unstretched polyolefin film or the like can be preferably used.

As for the metal layer, a layer made of aluminum foil, stainless foil, or copper foil can be used. Furthermore, the heat resistant resin film means a resin film which has melting point higher than the melting point of a thermoplastic resin film to be an inner layer. When the heat resistant resin film is used for an outer layer, only the thermoplastic resin film to be an inner layer can be sufficiently heated and melted and heat sealing of an exterior cell container can be surely achieved.

Examples of the laminate film include a film obtained by coating a heat resistant resin (for example, polyamide rein and polyester resin), among the surfaces of metal layer like aluminum and nickel, on the first surface to become an outer surface of the container 20 and coating a thermoplastic resin (for example, polyethylene and polypropylene) on the second surface to become an inner surface of the container 20.

Among the lithium ion cells of the present invention, when the lithium ion cell L having the container 20 with flexibility is applied with stress S in a direction for bending the lithium ion cell L, it may be bent with the single cell 1 with flexibility as illustrated in FIGS. 2 and 3B. According to a lithium ion cell of a related art, a crack may be generated according to bending in an active material layer or peeling may occur at an interface with a current collector. However, since the positive electrode active material layer 5 and the negative electrode active material layer 6 contained in the single cell 1 which is used for the present invention is a non-bound material of the positive electrode active material particle and negative electrode active material particle, respectively, as illustrated in detail in FIG. 2, the positive electrode active material particle 11 and the negative electrode active material particle 12 do not generate gaps or the like within the active material layer, and thus they can be deformed while the contact among active material particles is maintained.

If the positive electrode active material particle 11 and the negative electrode active material particle 12 are a coated active material particle of which surface is at least partially coated with a coating layer which consists of a coating agent containing a resin for coating, the coating layer functions as a lubricating layer in a region in which the active material particles are in contact with each other and the movement of the active material particles can be facilitated in such contact region. Therefore, as no gaps are generated in a region in contact with neighboring active material particles, the coated active material particles can move more easily, and even when the positive electrode active material layer 5 and the negative electrode active material layer 6 are deformed, even better contact among the active material particles can be maintained, and therefore desirable.

According to the single cell 1 used in the present invention, the positive electrode active material particle 11 and the negative electrode active material particle 12 are not bound so that the active material particle can move while it maintains a contact with neighboring active material particle. Accordingly, even when the lithium ion cell L is deformed according to application of stress S in the direction for bending the lithium ion cell L, a crack is not generated in the active material layer or peeling does not occur at an interface with a current collector so that the conductive path between the positive electrode current collector 7 and the negative electrode current collector 8 can be maintained and sufficient charge and discharge characteristics can be continuously exhibited.

The lithium ion cell L obtained as above can have flexibility all over the cell. As a result, as illustrated in FIG. 3B, even when stress S1 and S2 are simultaneously applied to any of the long direction and the short direction of the lithium ion cell L, the lithium ion cell L can be bent along the long direction and the short direction of the lithium ion cell L. In addition, even when the lithium ion cell L is bent in two directions, the conductive path is maintained between the positive electrode current collector 7 and the negative electrode current collector 8 and sufficient charge and discharge characteristics can be continuously exhibited.

Figure 4:
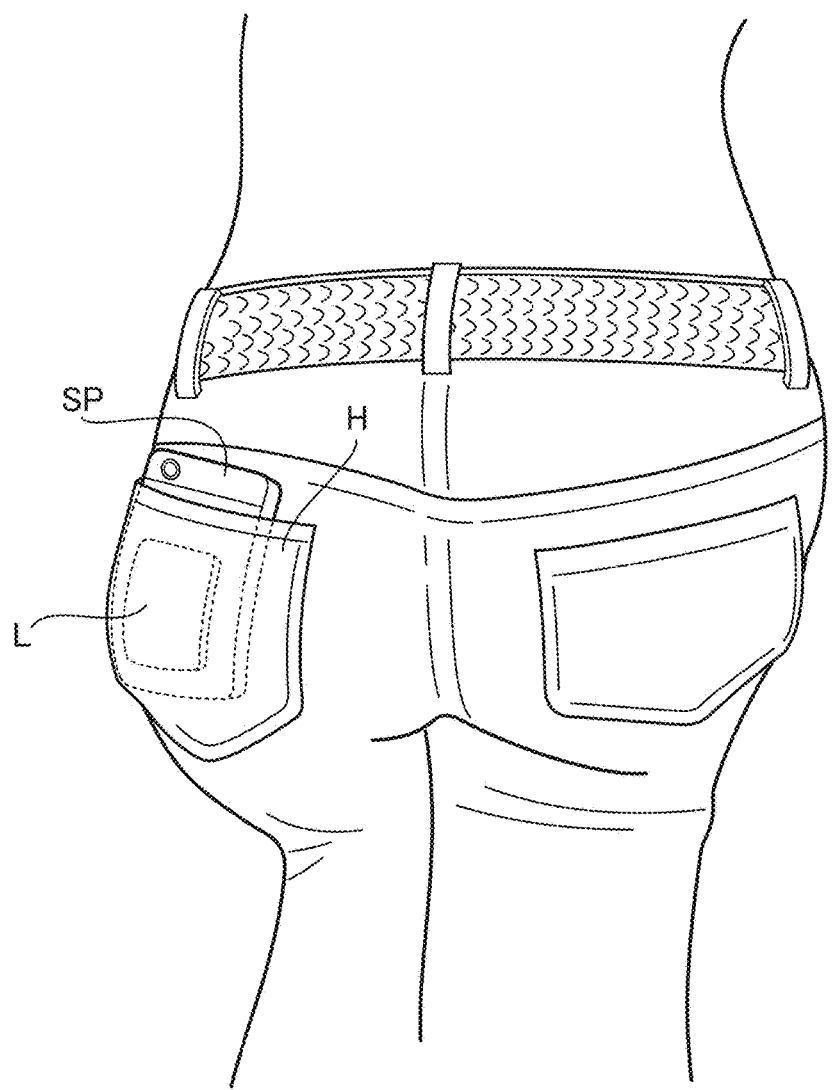
FIG. 4 is a drawing illustrating the lithium ion cell according to the first embodiment in operating state.
Figure 5:
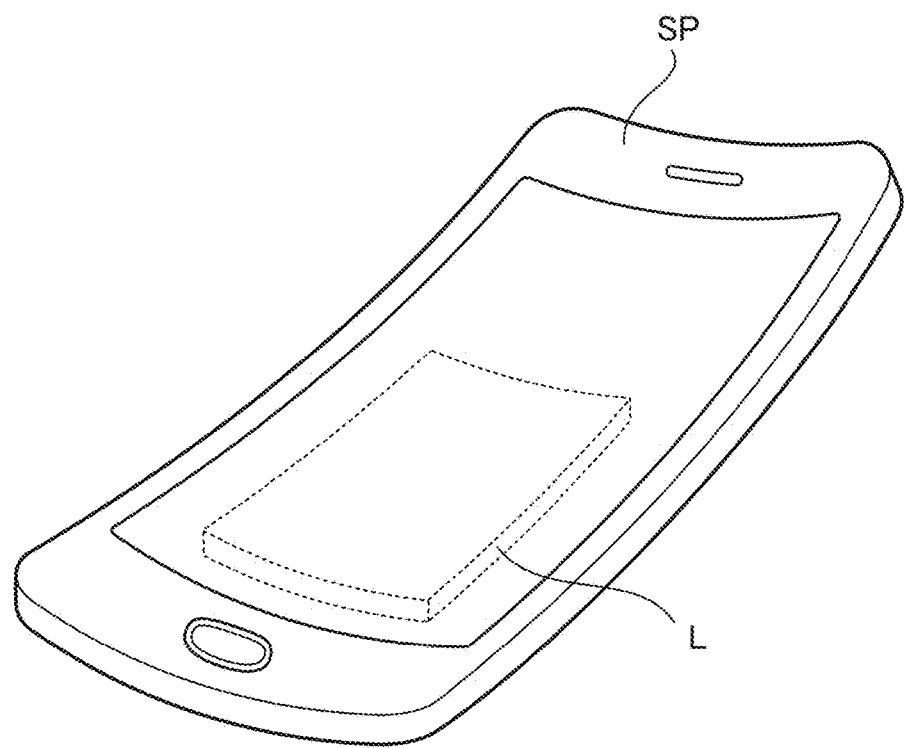
FIG. 5 is a drawing illustrating a state in which the lithium ion cell according to the first embodiment is mounted in a portable electronic device.

Thus, as illustrated in FIG. 5, the lithium ion cell L according to the first embodiment can be embedded, as a power source cell for driving a portable electronic device SP like smart phone, in a portable electronic device SP. Furthermore, as illustrated in FIG. 4, when the portable electronic device SP illustrated in FIG. 5 is inserted to a hip pocket H of trousers (pants) of an operator, even when the portable electronic device SP is bent following the hip curve of an operator, the lithium ion cell L can continuously exhibit sufficient charge and discharge characteristics, and thus it is possible to use continuously the portable electronic device SP.

Next, the lithium ion cell L' as the second embodiment of the present invention is described in view of FIGS. 16 to 19. The lithium ion cell L' of the second embodiment has a stacked power generating part obtained by stacking a plurality of single cells in which a positive electrode current collector, a positive electrode active material layer, a separator, a negative electrode active material layer, and a negative electrode current collector are stacked in the order.

Figure 16:
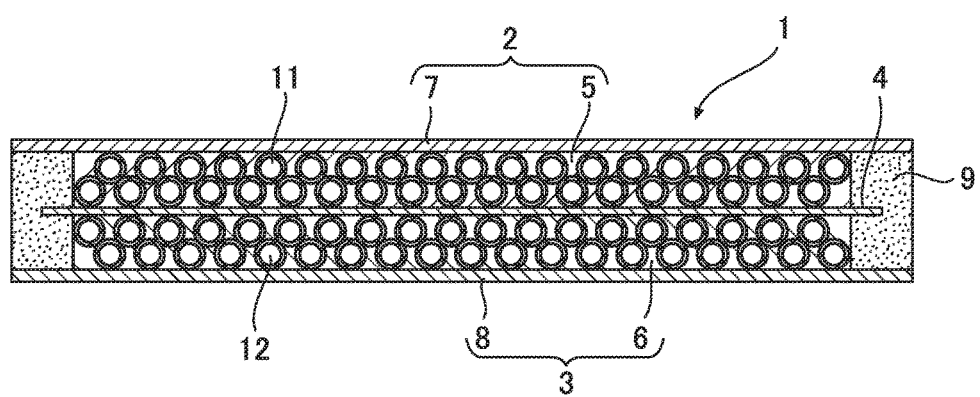
FIG. 16 is a cross-sectional view of a single cell provided in a lithium ion cell according to a second embodiment of the present invention.
Figure 17:
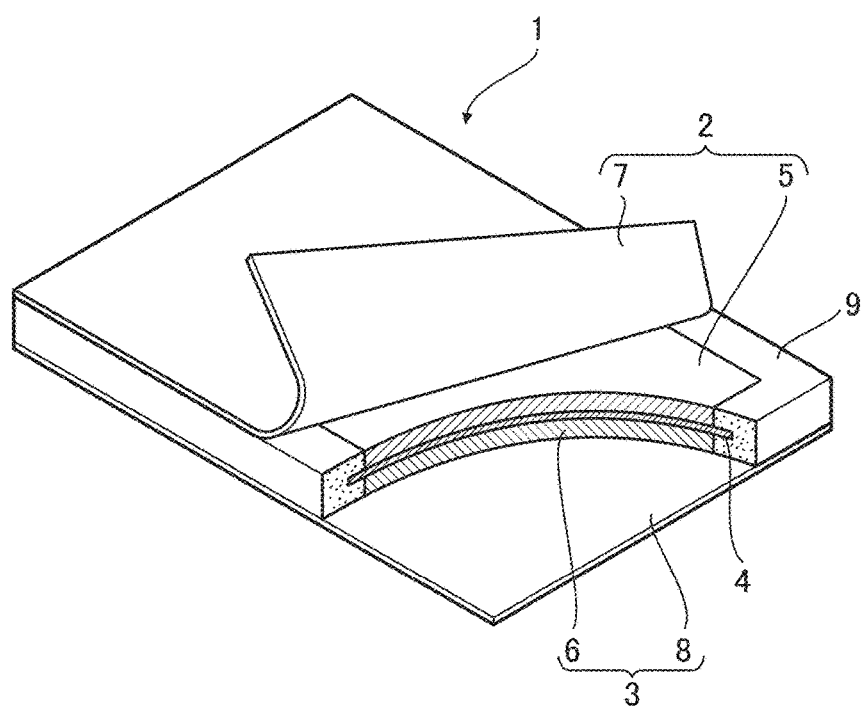
FIG. 17 is a partial cutaway perspective view of a single cell provided in the lithium ion cell according to the second embodiment.
Figure 18:
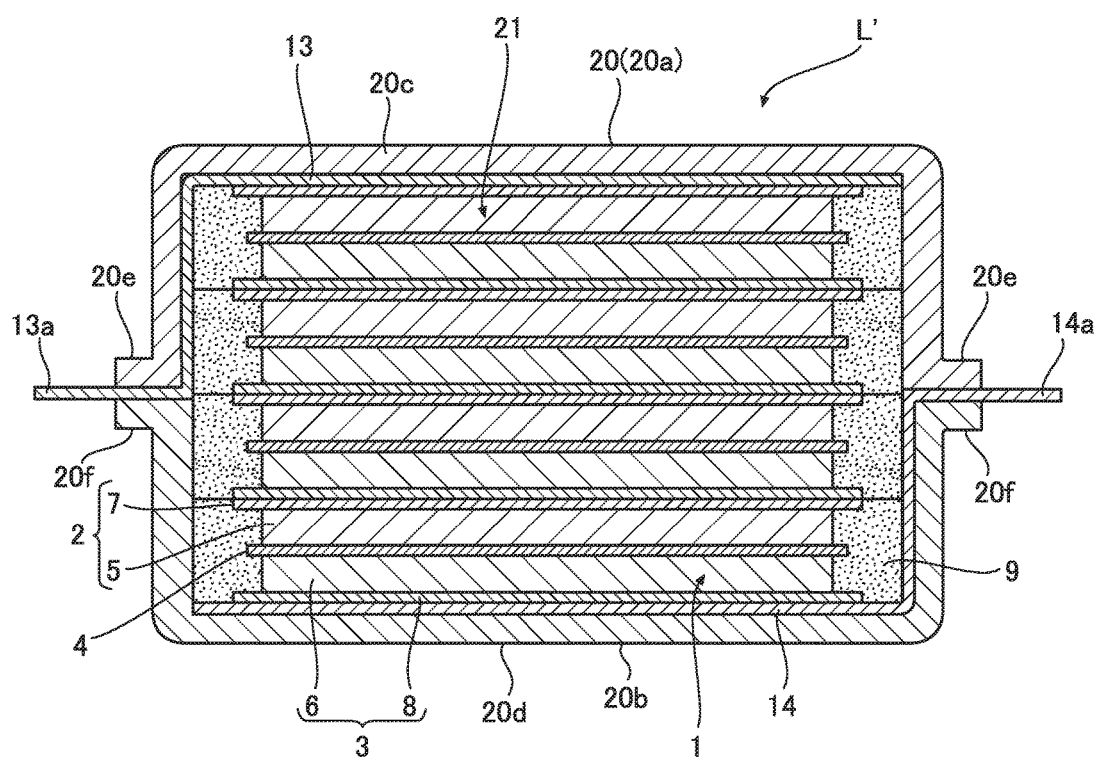
FIG. 18 is a cross-sectional view of the lithium ion cell according to the second embodiment.
Figure 19:
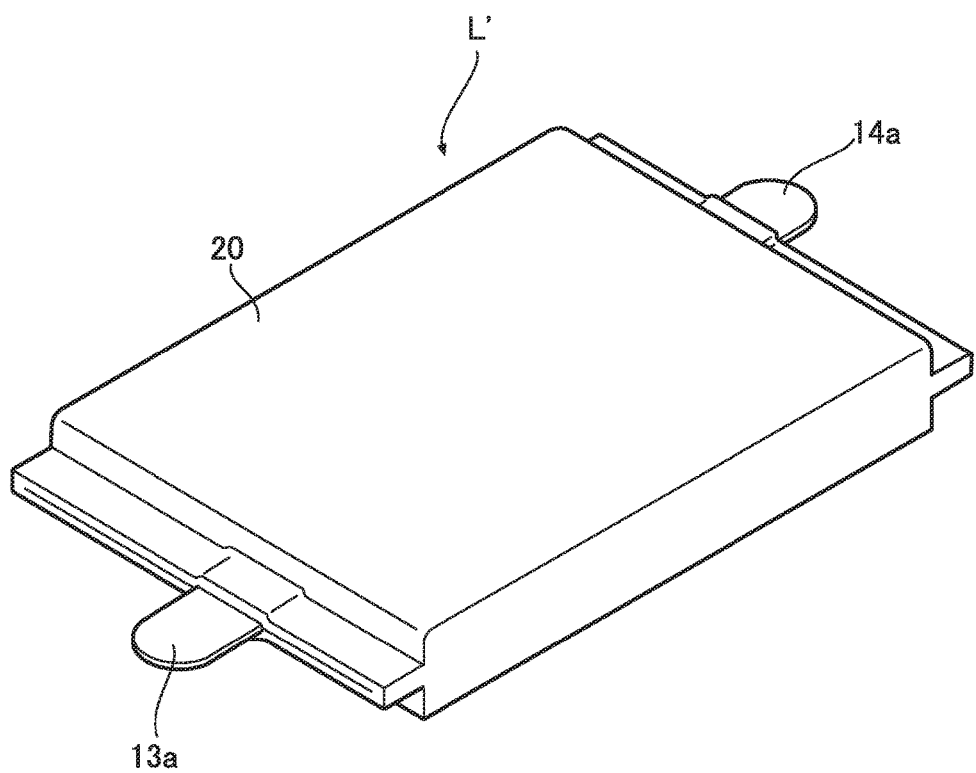
FIG. 19 is a perspective view of the lithium ion cell according to the second embodiment.

FIG. 16 is a cross-sectional view of a single cell provided in the lithium ion cell L' of the second embodiment of the present invention, FIG. 17 is a partial cutaway perspective view of a single cell provided in the lithium ion cell L' of the second embodiment, FIG. 18 is a cross-sectional view showing the structure of a lithium ion cell L' of the second embodiment, and FIG. 19 is a perspective view of the lithium ion cell L' of the second embodiment.

In those drawings, the lithium ion cell L' according to this embodiment is formed by accommodating, in the exterior cell container 20, the stacked power generating part 21 in which two or more single cells 1 are stacked.

As illustrated in FIG. 18, the power generation part included in the lithium ion cell L' is formed as the stacked power generating part 21, and one single cell 1 and the other single cell 1 neighboring to the one single cell 1 is stacked serially such that the top surface of the positive electrode current collector 7 of one single cell 1 and the bottom surface of the negative electrode current collector 8 of other single cell 1 maintain an electric contact. Furthermore, as the stacked power generating part 21 is accommodated in the container 20 by sealing under reduced pressure, the lithium ion cell L' according to this embodiment is formed as illustrated in FIGS. 18 and 19.

For stacking the single cell 1, the method for stacking is not limited as long as the top surface of the positive electrode current collector 7 of one single cell 1 and the bottom surface of the negative electrode current collector 8 of the other single cell 1 neighboring to the one single cell 1 maintain an electric contact. It is also possible that a member for assisting forming of a laminate or a known heat-releasing member like electrically conductive adhesive member can be disposed between the top surface of the positive electrode current collector 7 and the bottom surface of the negative electrode current collector 8.

With regard to the positive electrode current collector 7, the positive electrode active material layer 5, the separator 4, the negative electrode active material layer 6, the negative electrode current collector 8, and the sealing member 9 that are used for the lithium ion cell L' according to this embodiment, the same positive electrode current collector 7, positive electrode active material layer 5, separator 4, negative electrode active material layer 6, negative electrode current collector 8, and sealing member 9 as those of the first embodiment can be used.

As for the container 20 used for the lithium ion cell L', the same container as the container 20 of the first embodiment can be also used.

Figure 20:
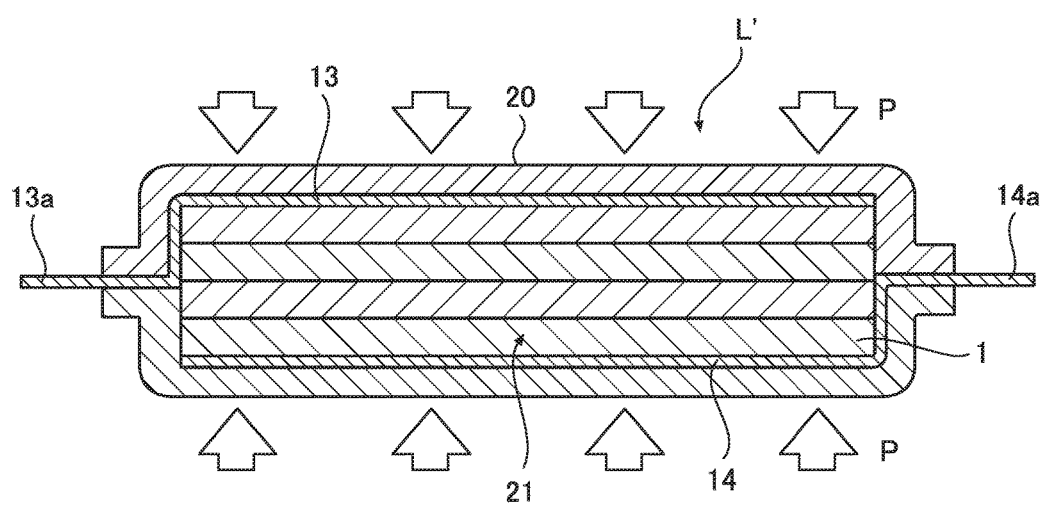
FIG. 20 is a drawing illustrating the operation of the lithium ion cell according to the second embodiment.

The lithium ion cell L' having the stacked power generating part 21 as a laminate of the single cell 1 has the stacked power generating part 21 in which the single cell 1 with flexibility is stacked. Thus, if the container 20 having the stacked power generating part 21 is sealed after de-pressurizing the inside of the container, atmospheric pressure P is evenly applied to the lithium ion cell L' from the outside of the container 20 as illustrated in FIG. 20, and the positive electrode current collector 7 of one single cell 1 and the negative electrode current collector 8 of the other single cell 1 neighboring to the one single cell 1 can be evenly adhered to each other without including any air bubble. Accordingly, even when a resin current collector having relatively lower electrical conductivity than a metal current collector is used for the positive electrode current collector 7 and the negative electrode current collector 8, an improvement and stabilization of cell characteristics can be obtained. Furthermore, as the stacked single cell 1 is evenly and closely adhered to each other, overall deformation of the lithium ion cell L' disappears and it is possible to have an effect of improving the cell characteristics and increasing the rigidity.

Furthermore, since the positive electrode active material layer 5 and the negative electrode active material layer 6 are a non-bound material, even when stress is applied to the lithium ion cell L', a contact among active material particles is maintained in the positive electrode active material layer 5 and the negative electrode active material layer 6, similar to the lithium ion cell L of the aforementioned first embodiment, and gaps or the like in the active material layer do not occur. Accordingly, even when a deformation occurs in the active material layer by having a large-size stacked power generating part or having a thicker active material layer, the conductive path can be maintained and sufficient charge and discharge characteristics can be exhibited.

If the positive electrode active material particle 11 and the negative electrode active material particle 12 are a coated active material particle of which surface is at least partially coated with a coating layer which consists of a coating agent, the coating layer functions as a lubricating layer in a region in which the active material particles are in contact with each other and the movement of the active material particles can be facilitated in such contact region, and thus more desirable. If there is a good movement of the active material particle in a region in contact with the neighboring active material particle, as an occurrence of gaps caused by a movement of the active material particle does not exist in the active material layer when a deformation occurs in the active material layer. Thus, the deformation can be alleviated, and therefore desirable.

In the single cell 1 used for the lithium ion cell L', the positive electrode active material particle 11 and the negative electrode active material particle 12 are not bound so that the active material particle can move while it maintains a contact with neighboring active material particle. Accordingly, the movement of the active material particle in a region in contact with the active material particles is not prevented and thus, even when the lithium ion cell L' is applied with stress, a crack is not generated in the active material layer or peeling does not occur at an interface with a current collector so that the conductive path between the positive electrode current collector 7 and the negative electrode current collector 8 can be maintained and sufficient charge and discharge characteristics can be continuously exhibited.

Figure 21:
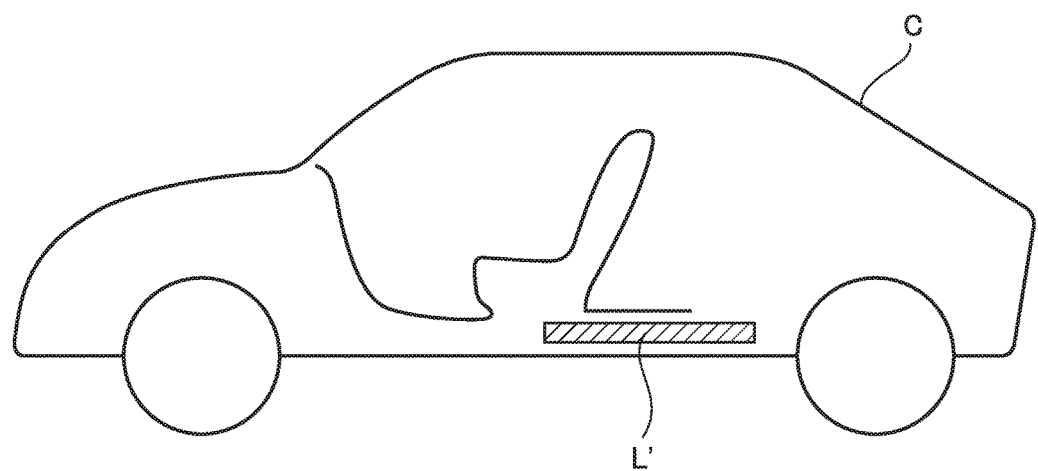
FIG. 21 is a conceptual drawing illustrating a state in which the lithium ion cell according to the second embodiment is mounted in a vehicle.

Thus, when the lithium ion cell L' of the second embodiment is mounted in the vehicle C as illustrated in FIG. 21, for example, even if vibration is given to the lithium ion cell L' according to driving of the vehicle C, sufficient charge and discharge characteristics can be continuously exhibited regardless of the vibration, and therefore desirable.

Furthermore, with regard to the lithium ion cell L' of the second embodiment, if the container 20 for accommodating the stacked power generating part 21 has flexibility, the lithium ion cell L' has flexibility all over the cell. Thus, when stress is applied simultaneously to the long direction and the short direction of the lithium ion cell L', the lithium ion cell L' can be bent along the long direction and the short direction of the lithium ion cell L'. Thus, even when the lithium ion cell L' is bent in two directions, the conductive path is maintained as the positive electrode active material layer 5 and the negative electrode active material layer 6 are a non-bound material, and sufficient charge and discharge characteristics can be continuously exhibited.

Furthermore, among the lithium ion cells of the present invention, the method for producing, as the first embodiment, the lithium ion cell L having a power generation part composed of the single cell 1 and the exterior cell container 20 for accommodating the power generation part is described.

First, between the top container 20a and the bottom container 20b that are formed in a pre-determined shape, a power generation part in which the current collecting member 13 which is used as necessary, the positive electrode current collector 7, the positive electrode active material layer 5, the separator, the negative electrode active material layer 6, the negative electrode current collector 8, and the current collecting member 14 used as necessary are stacked in the order is disposed.

The method for placing a power generation part between the top container 20a and the bottom container 20b can be performed as described below.

(Placing method 1) A method in which the current collecting member 13 used as necessary and the positive electrode current collector 7 are placed on the inner surface of the top container main body 20c, the current collecting member 14 used as necessary and the negative electrode current collector 8 are placed on an inner surface of the bottom container main body 20d, and then the positive electrode composition or negative electrode composition is filled in the concave part of the top container main body 20c and the bottom container main body 20d, respectively.

(Placing method 2) A method in which a power generation part having the positive electrode current collector 7, the positive electrode active material layer 5, the separator 4, the negative electrode active material layer 6, and the negative electrode current collector 8 are stacked in the order is placed between the top container main body 20c on which the current collecting member 13 used as necessary is placed and the bottom container main body 20d on which the current collecting member 14 used as necessary is placed.

(Placing method 3) A method in which a power generation part having the current collecting member 13 used as necessary, the positive electrode current collector 7, the positive electrode active material layer 5, the separator 4, the negative electrode active material layer 6, the negative electrode current collector 8, and the current collecting member 14 used as necessary are stacked in the order is placed between the top container 20a and the bottom container 20b.

With regard to (Placing method 1), the method for filling the positive electrode composition and negative electrode composition in the concave part of the top container main body 20c and the bottom container main body 20d is not limited, and a well-known method including a method of filling via a nozzle from a tank in which each of the positive electrode composition and negative electrode composition is stored, a method of filling each of the positive electrode composition and negative electrode composition in the concave part of the top container main body 20c and the bottom container main body 20d using an inkjet device, and a method of applying a positive electrode composition and a negative electrode composition molded to have sheet shape can be desirably used.

With regard to (Placing method 2) and (Placing method 3), when a power generation part having the current collecting member 13 which is used as necessary, the positive electrode current collector 7, the positive electrode active material layer 5, the separator 4, the negative electrode active material layer 6, the negative electrode current collector 8, and the current collecting member 14 which is used as necessary stacked in the order is placed between the top container main body 20c and the bottom container main body 20d, it is possible to place a power generation part composed of the single cell 1 by a method of stacking the positive electrode current collector 7 in which the positive electrode active material layer 5 is formed by coating with a positive electrode composition, the separator 4, and the negative electrode current collector 8 in which the negative electrode active material layer 6 is formed by coating with a negative electrode composition.

Furthermore, if the positive electrode composition and negative electrode composition are filled in the concave part of the top container main body 20c and the bottom container main body 20d, the amount of the positive electrode composition and negative electrode composition is an amount that is just sufficient for filling at least the concave part with the positive electrode composition or negative electrode composition, and it is preferably an amount that the positive electrode composition or negative electrode composition is slightly thicker at the top container edge part 20e and the bottom container edge part 20f.

When each of the positive electrode composition and negative electrode composition is filled in the concave part of the top container main body 20c and the bottom container main body 20d, respectively, by placing subsequently the separator 4 with flat plate shape on any top surface of the top container main body 20c and the bottom container main body 20d, the top surface of the positive electrode active material layer 5 or the negative electrode active material layer 6 is covered with the separator 4. In that case, when the positive electrode composition or negative electrode composition is filled, in the concave part of the top container main body 20c and the bottom container main body 20d, only in an amount to have thicker composition at the top container edge part 20e and the bottom container edge part 20f, it is preferable that the separator 4 is applied while the top surface of the separator 4 is pressed with a roller so that the positive electrode active material layer 5 or the negative electrode active material layer 6 is evenly spread.

When each of the positive electrode composition and negative electrode composition is filled in the concave part of the top container main body 20c and the bottom container main body 20d, after applying the separator 4, any one of the top container main body 20c and the bottom container main body 20d is reversely rotated in the vertical direction and the top container 20a and the bottom container 20b are disposed such that the top container edge part 20e and the bottom container edge part 20f face oppositely. In this state, by de-aerating the inside of the accommodation part formed by the top container 20a and the bottom container 20b and sealing the top container edge part 20e and the bottom container edge part 20f with a sealing member, the lithium ion cell L as illustrated in FIGS. 1 and 3A can be obtained.

As for the lithium ion cell L produced by the production method described above, preferably at least one operation of charge and discharge is performed by further applying pressure in perpendicular direction (preferably, 0.1 to 0.5 MPa) to the plane of the cell L. By applying the pressure, adhesiveness among the positive electrode current collector, positive electrode active material layer, separator, negative electrode active material layer and negative electrode current collector is improved, and thus interface resistance is reduced. Thus, by performing charge and discharge in this state, more favorable cell characteristics can be exhibited. Furthermore, it is sufficient that the charge and discharge performed by applying pressure to the lithium ion cell L is performed once at least, and after that, favorable cell characteristics can be exhibited even if the applied pressure is removed. In this regard, it is believed that, a suitable conductive path is created by performing once the charge and discharge in pressurized state, and the conductive path is maintained even after the pressure is removed. As for the method of applying vertical pressure to the plane of the lithium ion cell L, a method of using a press machine, a method of inserting a hard plane member like metal plate, or the like can be used.

Next, descriptions are given for the method for producing the lithium ion cell L' of the present invention having the second embodiment.

First, by forming the positive electrode active material layer 5 and the negative electrode active material layer 6 on the surface of each of the positive electrode current collector 7 and the negative electrode current collector 8, the positive electrode 2 and the negative electrode 3 are formed. The method for forming the positive electrode 2 and the negative electrode 3 is not limited, and there are various methods like a method of coating a positive electrode composition and a negative electrode composition on the surface of each of the positive electrode current collector 7 and the negative electrode current collector 8, a method of applying, via a nozzle or the like, a positive electrode composition and a negative electrode composition on the surface of each of the positive electrode current collector 7 and the negative electrode current collector 8 and spreading them using a spatula or the like to have a pre-determined thickness, and a method of applying the positive electrode active material layer 5 and the negative electrode active material layer 6, obtained by molding a positive electrode composition and a negative electrode composition to a sheet shape, as the positive electrode 2 and the negative electrode 3 can be mentioned. When the positive electrode composition and negative electrode composition are molded into a sheet shape, each of the positive electrode composition and negative electrode composition may be coated to have a pre-determined thickness on a substrate with sheet shape, and by removing a non-aqueous solvent, they can be molded into a sheet shape while the active materials are not bound to each other.

After that, the positive electrode 2 and the negative electrode 3 are stacked while having the separator 4 interposed therebetween, and by sealing the terminal part of the positive electrode current collector 7 and the negative electrode current collector 8 and also the terminal part of the separator 4 with the sealing member 9, the single cell 1 can be produced.

Subsequently, by stacking serially the single cell 1 which has been produced according to the process described above such that the top surface of the positive electrode current collector 7 of one single cell 1 and the bottom surface of the negative electrode current collector 8 of the other single cell 1 neighboring to one single cell 1 are brought close to each other, the stacked power generating part 21 is formed. Furthermore, by accommodating the stacked power generating part 21 in the container 20 together with the current collecting member 13 and 14, de-aerating the inside of the container 20, and performing sealing with a sealing member, the lithium ion cell L' of this embodiment can be produced. In addition to a chemical agent like an electrically conductive adhesive member for assisting forming of a laminate between the top surface of the positive electrode current collector 7 and the bottom surface of the negative electrode current collector 8 of the neighboring single cell 1, a known member like a heat-releasing member can be also applied.

Similar to the lithium ion cell L, the lithium ion cell L' produced by the aforementioned production method is preferably subjected to at least one operation of charge and discharge by applying pressure in perpendicular direction (preferably, 0.1 to 0.5 MPa) to the plane of the cell L'. As for the method of applying pressure in perpendicular direction to the plane of the lithium ion cell L', the same method as the method for the lithium ion cell L can be also used.

Figure 7A:
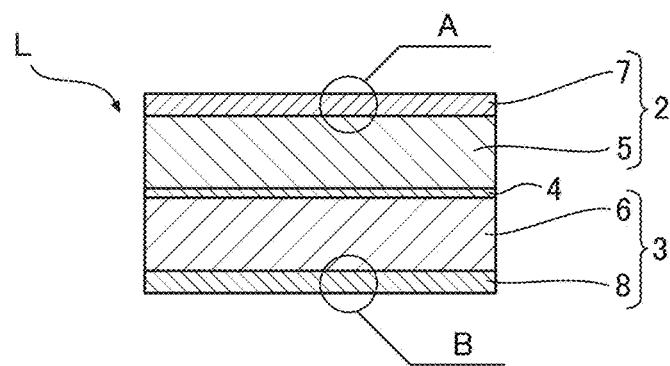
FIG. 7A is a cross-sectional view illustrating the main part of the variation example of a single cell included in the lithium ion cell of the present invention.
Figure 7B:
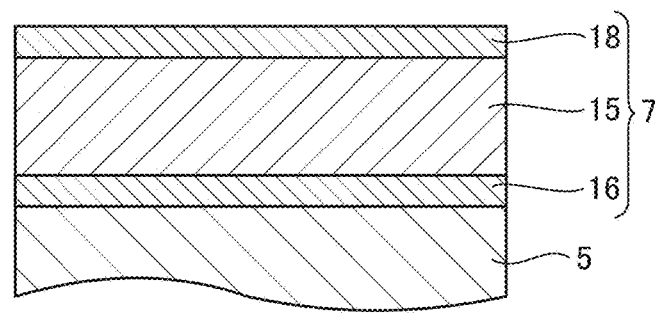
FIG. 7B is an enlarged cross-sectional view of Circle A of FIG. 7A.
Figure 7C:
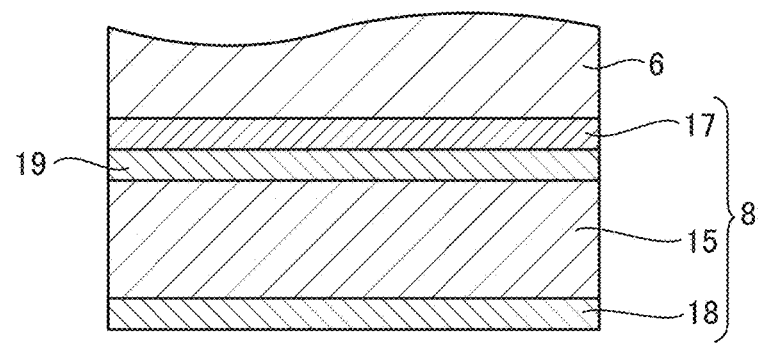
FIG. 7C is an enlarged cross-sectional view of Circle B of FIG. 7A.

Next, in view of FIGS. 7A, 7B and 7C, a variation example of the single cell contained in the lithium ion cell of the present invention is described. FIG. 7A is a cross-sectional view illustrating the main part of a single cell included in the lithium ion cell of the present invention, FIG. 7B is an enlarged cross-sectional view of Circle A of FIG. 7A, and FIG. 7C is an enlarged cross-sectional view of Circle B of FIG. 7A.

The difference between the single cell illustrated in FIGS. 7A to 7C and the single cell contained in the lithium ion cell L as the aforementioned embodiment illustrated in FIGS. 1, 2, and 6 and the lithium ion cell L' as the aforementioned embodiment illustrated in FIGS. 16 to 18 lies in the constitution of the positive electrode current collector 7 and the negative electrode current collector 8.

More specifically, as illustrated in FIG. 7B, the positive electrode current collector 7 is constituted such that, on the bottom surface of the substrate 15 which is a metal current collector or a resin current collector, that is, on a surface to which the positive electrode active material layer 5 is stacked (bottom surface in FIG. 7B), the first electrically conductive layer 16 is formed, and on the top surface of the substrate 15, that is, on the outermost surface side of the power generation part 1 (top surface in FIG. 7B), the third electrically conductive layer 18 is formed, and each of the first electrically conductive layer 16 and the third electrically conductive layer 18 is in electric contact with the substrate 15.

If the stacked power generating part 21 contained in the lithium ion cell L' of the aforementioned second embodiment which is illustrated in FIG. 18 or the like is formed by stacking a single cell illustrated in FIGS. 7A to 7C, with regard to the positive electrode current collector 7 which is present next to the negative electrode current collector 8, an electrically conductive adhesive layer composed of an electrically conductive adhesive member may be further applied on top of the third electrically conductive layer 18 from the viewpoint of having adhesiveness to the negative electrode current collector 8, or the like.

With regard to the negative electrode current collector 8 used for a variation example of the single cell included in the lithium ion cell of the present invention, as illustrated in FIG. 7C, the second electrically conductive layer 17 is disposed on the surface of the substrate 15 to which the negative electrode active material layer 6 is stacked (top surface side of the substrate 15 in FIG. 7C), the third electrically conductive layer 18 is disposed on the outermost surface of the power generation part 1 of the substrate 15 (bottom surface side of the substrate 15 in FIG. 7C), and each of the first electrically conductive layer 16 and the second electrically conductive layer 17 is in electric contact with the substrate 15. In FIG. 7C, another electrically conductive layer 19 (preferably, the same electrically conductive layer as the third electrically conductive layer 18) is formed in advance on the top surface side of the substrate 15, and the second electrically conductive layer 17 is formed on top of the layer 19. As another electrically conductive layer 19 has an electric contact with each of the substrate 15 and the second electrically conductive layer 17, the second electrically conductive layer 17 can maintain the electric contact with the substrate 15.

Since other constitutions are the same as those of the lithium ion cell L and the lithium ion cell L', which are given as an embodiment in the above, the same constitutional element is given with the same symbol and only the simplified descriptions will be given herein.

In FIGS. 7B and 7C, the substrate 15 for constituting the positive electrode current collector 7 and the negative electrode current collector 8 has almost the same constitution as the metal current collector or resin current collector among the positive electrode current collector 7 and the negative electrode current collector 8 for constituting the lithium ion cell L and the lithium ion cell L', which are given as an embodiment in the above, and thus no further descriptions are given herein.

Accordingly, by disposing each of the first electrically conductive layer 16 and the second electrically conductive layer 17 between the substrate 15 and the positive electrode active material layer 5 or the negative electrode active material layer 6, a contact resistance between the positive electrode active material layer 5 and the positive electrode current collector 7, and between the negative electrode active material layer 6 and the negative electrode current collector 8 can be lowered. As a result, the durability of the lithium ion cell L and the lithium ion cell L', in particular, the charge and discharge cycle durability of an electrode can be further improved.

Each of the first electrically conductive layer 16 and the second electrically conductive layer 17 is formed of an electrically conductive member containing an electrically conductive material. The electrically conductive material is not particularly limited. However, it preferably contains at least one electrically conductive material selected from a group consisting of a metal with weaker ionization tendency than iron, at least one metal selected from a group consisting of iron, titanium, zirconium, tantalum and niobium, an alloy containing such metal as a main component, and conductive carbon. This is because, as those materials hardly form an oxide film with insulating property on their surface, the electric contact with an electrically conductive filler can be maintained for a long period of time.

Specific examples of the metal with weaker ionization tendency than iron include cobalt, nickel, tin, antimony, copper, silver, palladium, iridium, platinum, and gold. A metal would have increased electric resistance as an oxide film is formed, but the oxide film of a metal with weaker ionization tendency than iron has low electric resistance, and thus the contact resistance between the substrate 15 and the positive electrode active material layer 5 or the negative electrode active material layer 6 can be maintained at low level. Examples of the alloy include stainless steel (SUS).

As for the conductive carbon, those exemplified above as a conductive aid can be also mentioned.

It is preferable that the electrically conductive material to be contained in the first electrically conductive layer 16 and the second electrically conductive layer 17 is suitably selected depending on an application site of the electrically conductive member, that is, either the first electrically conductive layer 16 or the second electrically conductive layer 17.

For example, when the electrically conductive member is used for the first electrically conductive layer 16, the electrically conductive material is preferably at least one selected from a group consisting of conductive carbon, titanium and stainless steel. In other words, it is preferable that the active material layer is the positive electrode active material layer 5 and also the electrically conductive material preferably contains at least one electrically conductive material selected from a group consisting of conductive carbon, titanium and stainless steel. Since those materials have excellent corrosion resistance (oxidation resistance), the durability of an electrode can be further improved.

Furthermore, when the electrically conductive member is used for the second electrically conductive layer 17, the electrically conductive material is preferably at least one selected from a group consisting of nickel, copper, iron, and stainless steel. In other words, it is preferable that the active material layer is the negative electrode active material layer 6 and also the electrically conductive material preferably contains at least one selected from a group consisting of nickel, copper, iron, and stainless steel. Those materials can be useful for prevention of deterioration caused by insertion or release of $Li^+$ or alloying with Li.

The electrically conductive material may be used either singly or as a mixture of two or more kinds.

Shape of the electrically conductive material is not particularly limited, and a known shape like particle shape, powder form, fibrous shape (short fiber or long fiber), plate shape, bulk shape, cloth shape, and mesh shape can be suitably selected.

When the electrically conductive material has a particle shape or a powder form, the average particle diameter (average particle diameter of primary particle) is, although not particularly limited, preferably 0.01 to 10 µm, more preferably 0.01 to 3 µm, and even more preferably 0.01 to 1 µm or so. By having such size, the contact efficiency between the substrate 15 and an electrically conductive material is improved so that the electric contact efficiency between the substrate 15 and the electrically conductive material can be increased.

When the electrically conductive material has a fibrous shape, average fiber length is, although not particularly limited, preferably 0.1 to 100 µm. Furthermore, when the electrically conductive filler has a fibrous shape, average diameter is not particularly limited either. However, it is preferably 0.01 to 10 µm, more preferably 0.01 to 3 µm, and even more preferably 0.01 to 1 µm. By having such size, the electric contact efficiency between the substrate 15 and electrically conductive material can be improved, and when the electrically conductive filler has a fibrous shape, two-dimensional (horizontal direction) electric contact efficiency can be increased even with a small amount, and therefore desirable.

The electrically conductive member for forming the first electrically conductive layer 16 and the second electrically conductive layer 17 may be composed only of the electrically conductive material described above or it may contain other materials described below. When other materials are included, content of the electrically conductive material to be contained in the electrically conductive member is preferably higher than the content of the electrically conductive filler in the substrate 15. By having such constitution, the durability, in particular, the charge and discharge cycle durability of an electrode, can be further improved.

Furthermore, when the electrically conductive member for forming the first electrically conductive layer 16 and the second electrically conductive layer 17 contains the electrically conductive material and other materials, a polymer material can be used as the other material. Examples of the polymer material used as other materials of the electrically conductive member include an electrically conductive polymer [polyaniline, polypyrrole, polythiophene, polyacetylene, polyparaphenylene, polyphenylenevinylene, polyacrylonitrile, polyoxadiazole, or the like], a non-electrically conductive thermoplastic polymer {polyethylene [high density polyethylene (HDPE), low density polyethylene (LDPE), or the like], polypropylene, polystyrene, polyethylene terephthalate, poly ether nitrile, polyimide, polyamide, polyamideimide, polytetrafluoroethylene, styrene-butadiene rubber, polyacrylonitrile, polymethyl acrylate, polymethyl methacrylate, polyvinyl chloride, polyvinylidene fluoride, polyvinylidene chloride, or the like} and a non-electrically conductive thermosetting polymer [epoxy resin, unsaturated polyester resin, or the like]. They may be used either singly or as a mixture of two or more types. Among them, from the viewpoint of reducing the contact resistance, a non-electrically conductive thermosetting polymer is preferable. Although the reason remains unclear, it is believed that, if a non-electrically conductive thermosetting polymer is used, the electrically conductive material can have an ordered arrangement due to the stress generated by shrinking action during curing, and thus the electric contact between the substrate 15 and the electrically conductive member is improved.

In a case in which the electrically conductive member for forming the first electrically conductive layer 16 and the second electrically conductive layer 17 contains an electrically conductive material and a polymer material, content of the electrically conductive material is, relative to the total weight of the electrically conductive member, preferably 20 to 95% by weight, and more preferably 50 to 90% by weight. When a resin current collector is used as the substrate 15, content of the electrically conductive material in the electrically conductive member is preferably higher than the content of an electrically conductive filler contained in the resin current collector. By having this constitution, the durability, in particular, the charge and discharge cycle durability of an electrode, can be further improved.

The electrically conductive member for forming the first electrically conductive layer 16 and the second electrically conductive layer 17 is disposed on top of the substrate 15. With regard to a site at which the electrically conductive member is disposed, it may be disposed on the entire surface of the substrate 15 or only on the required area of the substrate 15 as long as it is on a surface of the substrate 15. When it is disposed only on the required area, the electrically conductive member is continuously or intermittently disposed on part of the surface of the substrate 15. Shape of the electrically conductive layer to be formed includes various shapes like a fishnet shape, a stripe shape, a lattice shape, a dot shape, and a band shape.

Thickness of the electrically conductive member which is disposed, as the first electrically conductive layer 16 and the second electrically conductive layer 17, on top of the substrate 15 is preferably 0.01 to 60 μm, and more preferably 0.1 to 30 μm.

Next, although the third electrically conductive layer 18 is in an electric contact with the substrate 15 similar to the first electrically conductive layer 16 and the second electrically conductive layer 17, the third electrically conductive layer 18 is disposed to reduce the contact resistance between the substrate 15 and the electrode terminal 7a and 8a as a current collecting plate.

In other words, as the third electrically conductive layer 18 is disposed between the substrate 15 and a current collecting plate, a two dimensional and/or three dimensional contact between the substrate 15 and a current collecting plate is increased so that the contact resistance can be reduced. Accordingly, the power characteristics of a cell can be improved.

The third electrically conductive layer 18 is formed of an electrically conductive member obtained by containing an electrically conductive material, and examples of the electrically conductive material include an electrically conductive material which has been exemplified above for the first electrically conductive layer 16 and the second electrically conductive layer 17.

Shape, average particle diameter, and average fiber length of the electrically conductive material are the same as those of the electrically conductive member which has been exemplified above for the first electrically conductive layer 16 and the second electrically conductive layer 17, and the preferred range is also the same.

In particular, in addition to the unlikeliness of having an insulating film on a surface as described above, from the viewpoint of easy obtainability and effective functioning as a conductive aid, the electrically conductive material is preferably composed of electrically conductive carbon, and acetylene black is more preferable.

The electrically conductive member for forming the third electrically conductive layer 18 may contain a polymer material in addition to the above electrically conductive material. Examples of the polymer material used as an electrically conductive member are the same as the polymer material which has been exemplified above for the first electrically conductive layer 16 and the second electrically conductive layer 17, and the preferred are also the same.

In a case in which the electrically conductive member for forming the third electrically conductive layer 18 contains an electrically conductive material and a polymer material, content of the electrically conductive material is the same as the content for the first electrically conductive layer 16 and the second electrically conductive layer 17, and the preferred range is also the same.

The electrically conductive member disposed as the third electrically conductive layer 18 on top of the substrate 15 may have the same shape as the shape described above for the first electrically conductive layer 16 and the second electrically conductive layer 17. Furthermore, although the electrically conductive member is preferably disposed on an interface between any one of the positive electrode current collector 7 and the negative electrode current collector 8 and the current collecting plate, it may be also disposed on both of the positive electrode current collector 7 and the negative electrode current collector 8.

Thickness of the electrically conductive member as the third electrically conductive layer 18 is preferably 0.01 to 50 μm, and more preferably 0.1 to 30 μm.

In a case in which an electrically conductive adhesive layer composed of an electrically conductive adhesive member is disposed on top of the third electrically conductive layer 18, those containing the above electrically conductive material and a cohesive or an adhesive may be used as an electrically conductive adhesive member within a range in which the effect of the electrically conductive material is not adversely affected.

The cohesive and adhesive which may be used is not particularly limited, and any known one can be used. Examples thereof include a cohesive and an adhesive which includes, as a main component, a thermoplastic resin such as an acrylic resin, a silicon resin, or a vinyl ether resin.

As for the acrylic resin containing a thermoplastic resin as a main component, a (co)polymer containing, as an essential constitutional monomer, (meth)acrylic acid ester as follows can be used: n-butyl (meth)acrylic acid, hexyl (meth)acrylic acid, 2-diethyl butyl (meth)acrylic acid, isooctyl (meth)acrylic acid, 2-methoxyethyl (meth)acrylic acid, 2-ethylhexyl (meth)acrylic acid, decyl (meth)acrylic acid, dodecyl (meth)acrylic acid, tridecyl (meth)acrylic acid, (meth)acrylic acid, itaconic acid, maleic acid, maleic anhydride, hydroxyethyl acrylic acid, hydroxypropyl acrylic acid, vinyl acetic acid, (meth)acrylamide, dimethyl (meth)acrylamide, methylaminoethyl (meth)acrylic acid, methoxyethyl (meth)acrylic acid, ethylene glycol di(meth)acrylate, tetraethylene glycol di(meth)acrylate, butanediol di(meth)acrylate and trimethylolpropane triacrylate. Furthermore, in the specification, the expression "(co)polymer" indicates a polymer and/or a copolymer.

As the silicon resin containing a thermoplastic resin as a main component, a (co)polymer having dimethyl siloxane as an essential constitutional monomer (also referred to as dimethylsiloxane gum and dimethylsiloxane resin) can be used.

As the vinyl ether resin containing a thermoplastic resin as a main component, a (co)polymer having ethyl vinyl ether, propyl vinyl ether, butyl vinyl ether, 2-ethylhexyl vinyl ether, or the like as an essential constitutional monomer can be mentioned.

As for the cohesive and adhesive, commercially available products can be used, and for example, POLYTHICK 310-S, AH-300, 410-SA, 430-SA, 470-S and 610-SA manufactured by Sanyo Chemical Industries, Ltd. can be used.

Content of the electrically conductive material in an electrically conductive adhesive member is, based on the total weight of an electrically conductive adhesive member, preferably 2 to 90% by weight, more preferably 3 to 85% by weight, even more preferably 5 to 75% by weight, and particularly preferably 5 to 60% by weight.

The method for forming each of the first electrically conductive layer 16, the second electrically conductive layer 17 and the third electrically conductive layer 18 on top of the substrate 15 is not particularly limited, but the examples thereof include (1) a method of transferring an electrically conductive member formed to have a sheet shape on top of the substrate 15, (2) a method of adhering an electrically conductive member formed to have a sheet shape to the substrate 15 by using an electrically conductive adhesive member, and (3) a method having a process of obtaining a laminate in which a coating film resulting from coating an ink containing an electrically conductive material on top of the substrate 15 is formed on top of the substrate 15.

The electrically conductive member formed to have a sheet shape can be obtained by coating a mixture in which an electrically conductive material and a polymer material are dissolved and dispersed in an organic solvent (N-methyl-2-vinylpyrrolidone or the like) on a non-adhesive film (polyolefin film, a polyimide film, or the like) to have a pre-determined thickness and forming a coating film by removing the organic solvent by drying or the like.

When the single cell described in FIGS. 7A, 7B and 7C is used for the lithium ion cell of the present invention, since the first electrically conductive layer 16 and the third electrically conductive layer 18 are disposed on the positive electrode current collector 7 and the first electrically conductive layer 16, the second electrically conductive layer 17, and the third electrically conductive layer 18 are disposed on the negative electrode current collector 8, in addition to the same effect as the lithium ion cell L and L' of the embodiments described in detail in the above, contact resistance between the positive electrode current collector 7 and the positive electrode active material layer 5, contact resistance between the negative electrode current collector 8 and the negative electrode active material layer 6, contact resistance between the positive electrode current collector 7 and the electrode terminal 7a, and contact resistance between the negative electrode current collector 8 and the electrode terminal 8a can be lowered, and the durability of a lithium ion cell, in particular, the charge and discharge cycle durability of an electrode, can be further improved.

Furthermore, all of the first electrically conductive layer 16, the second electrically conductive layer 17 and the third electrically conductive layer 18 are not essential, and it is possible to have a constitution in which any one of the first electrically conductive layer 16 and the second electrically conductive layer 17, which are disposed on a surface of the substrate 15 on which the positive electrode active material layer 5 or the negative electrode active material layer 6 is stacked, and the third electrically conductive layer 18, which is disposed on the outermost surface of the power generation part 1 of the substrate 15, is disposed.

Next, an application example of the lithium ion cell according to the present invention is described with reference to FIG. 8 to FIG. 11.

Figure 8:
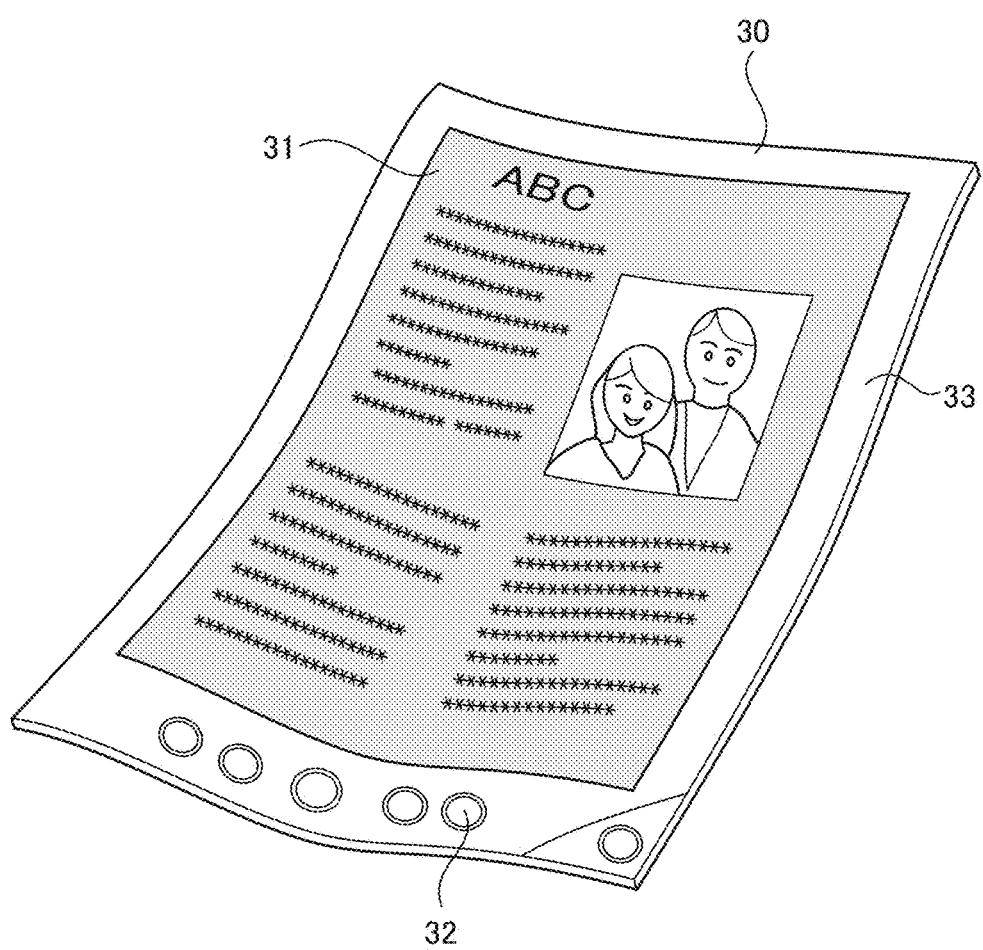
FIG. 8 is a perspective view illustrating an electronic device in which the lithium ion cell according to the first embodiment is mounted.
Figure 9:
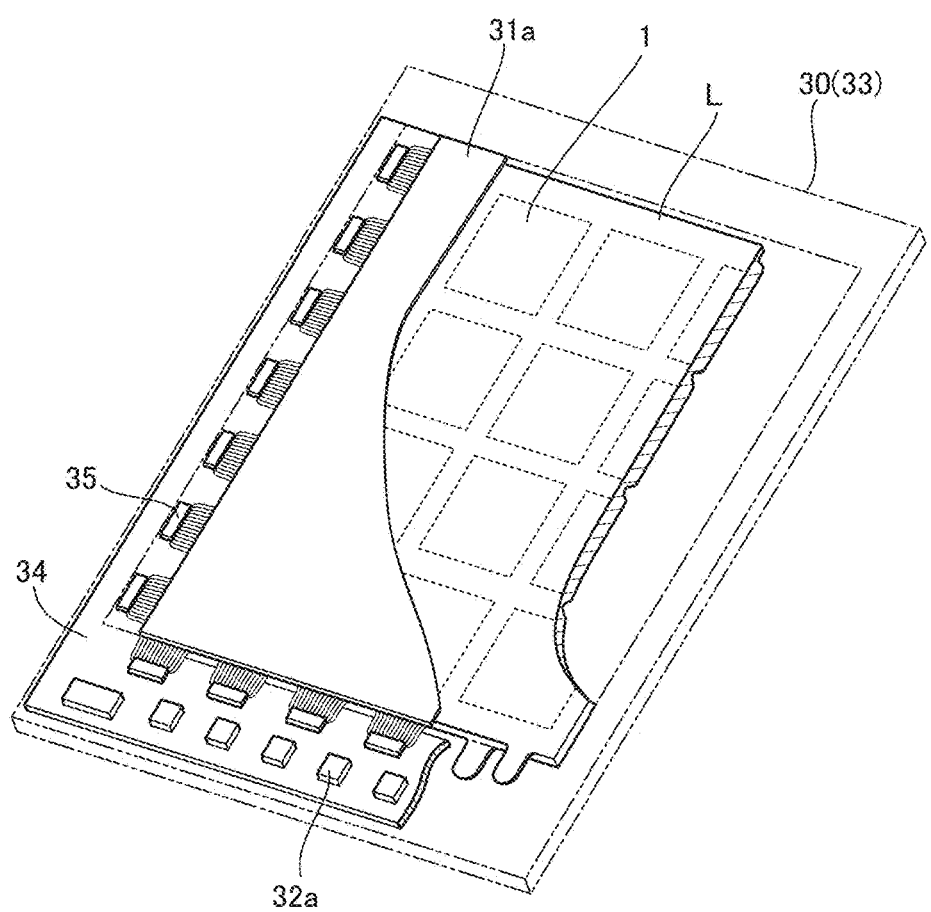
FIG. 9 is a partial cutaway perspective view illustrating the electronic device illustrated in FIG. 8.
Figure 10:
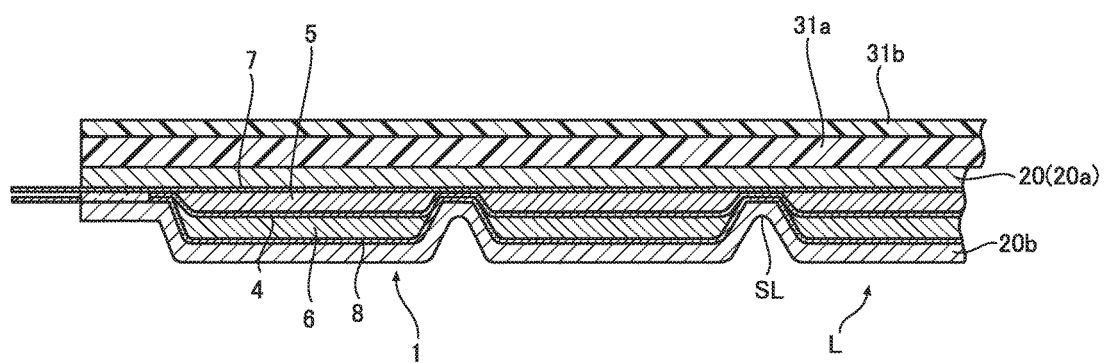
FIG. 10 is a cross-sectional view illustrating the main part of the lithium ion cell mounted in the electronic device illustrated in FIG. 8.
Figure 11:
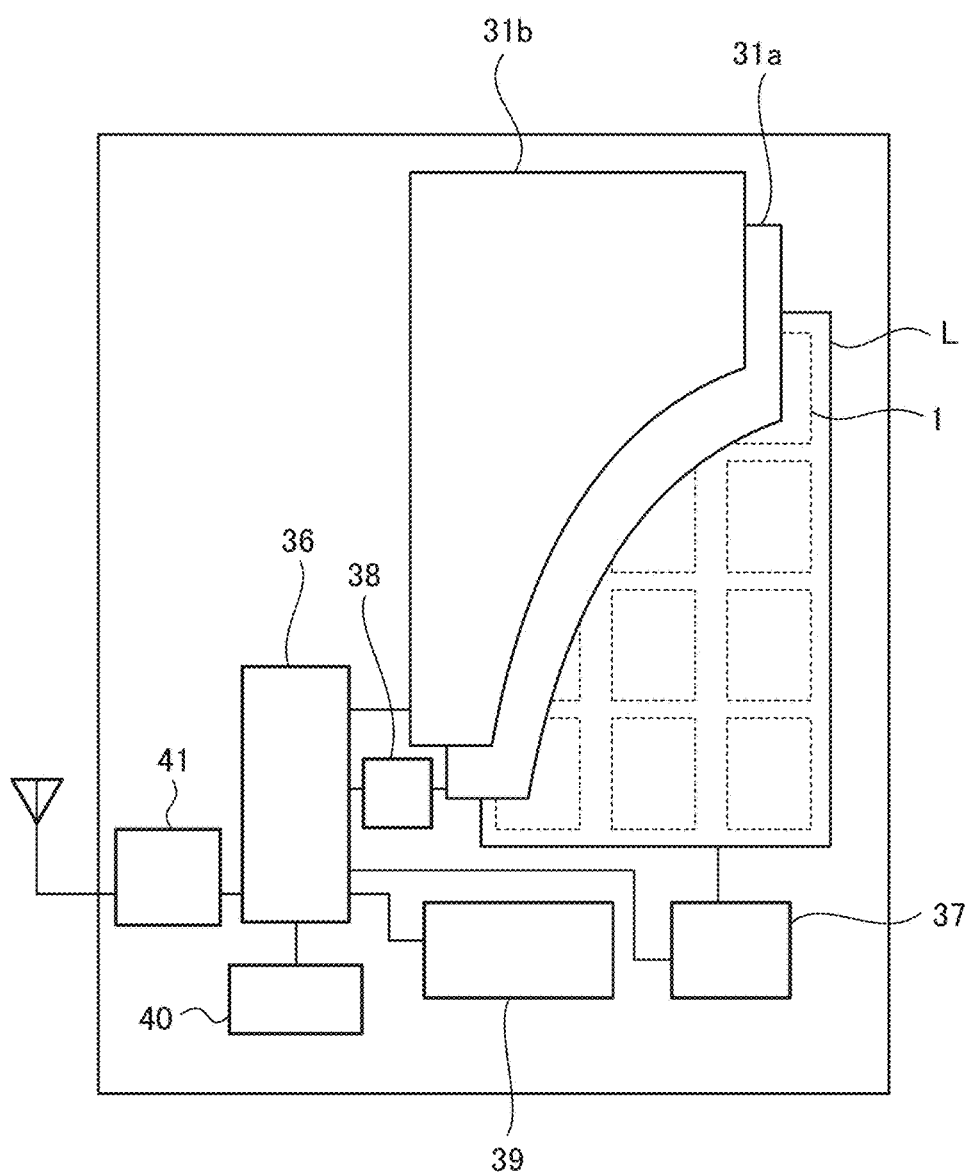
FIG. 11 is a block diagram illustrating the functional configuration of the electronic device illustrated in FIG. 8.

FIG. 8 is a perspective view illustrating an electronic device, in which a lithium ion cell L according to the first embodiment of the present invention is mounted, FIG. 9 is a partial cutaway perspective view illustrating the electronic device, in which the foregoing lithium ion cell L is mounted, FIG. 10 is a cross-sectional view illustrating a main part of another electronic device, and FIG. 11 is a block diagram illustrating a functional configuration of the electronic device, in which the foregoing lithium ion cell L is mounted.

In FIG. 8, reference numeral 30 denotes an electronic device in which the foregoing lithium ion cell L is mounted. The electronic device 30 is a so-called tablet device and formed to have a substantially rectangular plate-like external shape. The electronic device 30 includes, at its top surface in FIG. 8, a flexible display part 31 such as an electronic paper or an organic EL or the like, and operation buttons 32 that receive user's input operations similarly at lower part of the top surface in FIG. 8. In the electronic device 30, the members constituting the electronic device 30, such as the display part 31, a body 33 including the lithium ion cell, and the like are all formed of flexible members. This configuration allows the electronic device 30 to have flexibility as a whole.

FIG. 9 is a view of the electronic device 30 illustrated in FIG. 8. Here, the electronic device 30 is in a state that an upper part of the body 33 is removed. Inside the body 33, the electronic device 30 houses a display element 31a of the display part 31, a board 34, connectors 35 for electrically connecting the board 34 and the display element 31a and the like, and the foregoing lithium ion cell L. On the board 34, operation switches 32a, to which input operations received at the operation buttons 32 are transmitted, and semiconductor elements (not shown in the figure) for conducting various operations of the electronic device 30 are mounted.

The foregoing lithium ion cell L housed in the electronic device 30 is configured, as best illustrated in FIG. 10, in such a way that power generation parts 1 having rectangular shapes in planar view are formed at locations spaced from each other with a predetermined distance therebetween. Furthermore, as illustrated in FIG. 10, of a top container 20a and a bottom container 20b constituting the foregoing lithium ion cell L, the top container 20a is formed in a substantially flat plate-like shape whereas the bottom container 20b is formed so as to have depressions toward the upper side of the figure at parts where the power generation parts 1 are not formed, thereby forming grooves SL around the respective power generation parts 1. This allows the lithium ion cell L to bend at part where the groove SL is formed even in the case that the area of the lithium ion cell L is large. Accordingly, together with flexibility of the power generation parts 1, overall flexibility of the foregoing lithium ion cell L may be secured in a more reliable manner.

Furthermore, as illustrated in FIG. 10, a touch panel 31b is formed on the display element 31a at its top surface in the figure. The display element 31a, the touch panel 31b, and the like constitute the display part 31. Note that, in the illustration of FIG. 10, the board 34 is omitted.

FIG. 11 is a block diagram illustrating a schematic circuit configuration of the electronic device 30. In this figure, reference numeral 36 denotes a control part including a CPU and the like for performing an overall control of the electronic device 30, reference numeral 37 denotes a power supply control part for controlling power supply and charging of the lithium ion cell, reference numeral 38 denotes a display control part for performing a display control of the display part 31, reference numeral 39 denotes an operating part for receiving an input operation from the operation button 32 and sending an input signal to the control part 36, reference numeral 40 denotes a memory part for temporarily and non-temporarily storing a variety of data, and reference numeral 41 denotes a communication part for performing communication with a mobile communication network or a wireless LAN.

Accordingly, the electronic device 30 is flexible as a whole since components constituting the electronic device 30 and the like are flexible. Furthermore, the lithium ion cell L mounted in the electronic device 30 is flexible and capable of continuously maintaining sufficient charging and discharging characteristics even when the lithium ion cell L is bent. This enables the continuous use of the electronic device 30 even when the electronic device 30 is bent.

Furthermore, there is a demand for larger displays and lighter weights in recent tablet terminals. To pursue both the larger display and the lighter weight, it is desirable to form the whole tablet terminal in a thin rectangular plate-like shape. On the other hand, when the body is a typical metal chassis and formed in a thin rectangular plate-like shape, it is difficult to obtain high rigidity. The lithium ion cell L according to the first embodiment of the present invention is capable of maintaining sufficient charging and discharging characteristics even when the lithium ion cell L is bent. The use of the foregoing lithium ion cell L enables sufficient suppression of possible degradation in the characteristics due to deformation of the electronic device, which is formed in the thin rectangular plate-like shape.

Figure 12:
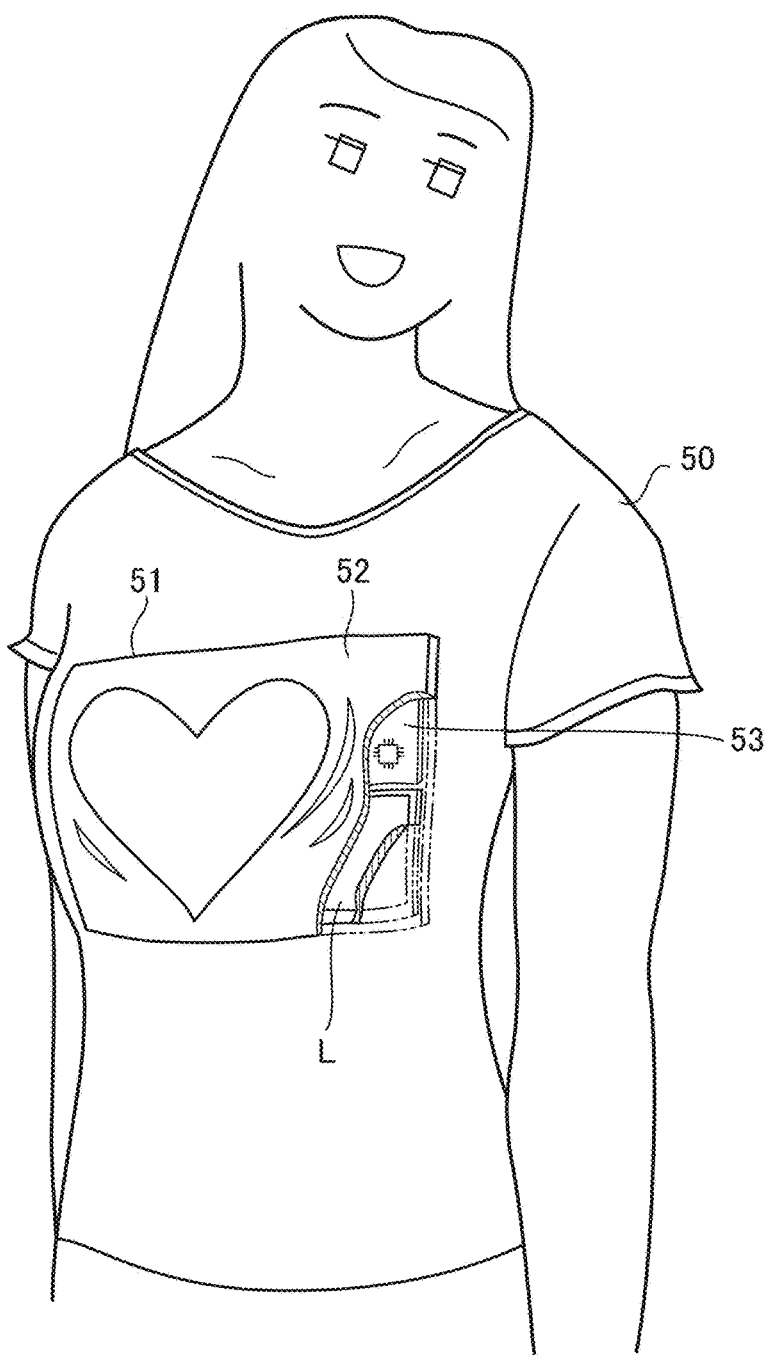
FIG. 12 is a partial cutaway perspective view of clothing in which the lithium ion cell according to the first embodiment is mounted.

Next, another application example of the lithium ion cell L according to the first embodiment of the present invention is described with reference to FIG. 12 and FIG. 13. FIG. 12 is a partial cutaway perspective view of clothing in which the foregoing lithium ion cell L is mounted, and FIG. 13 is a block diagram illustrating a functional configuration of the clothing illustrated in FIG. 12.

In these figures, reference numeral 50 denotes clothing such as a T-shirt and the like, in which the foregoing lithium ion cell L of the present invention is mounted. As illustrated in FIG. 12, a wearable terminal 51 is attached to a chest part of the clothing 50, and the foregoing lithium ion cell L is mounted in the wearable terminal 51.

The wearable terminal 51 includes a flexible display part 52 such as an electronic paper, an organic EL, and the like, a board 53 on which semiconductor elements (not shown in the figure) are mounted for conducting various operations, and the foregoing lithium ion cell L. The display part 52 and the board 53 are formed of flexible members.

Figure 13:
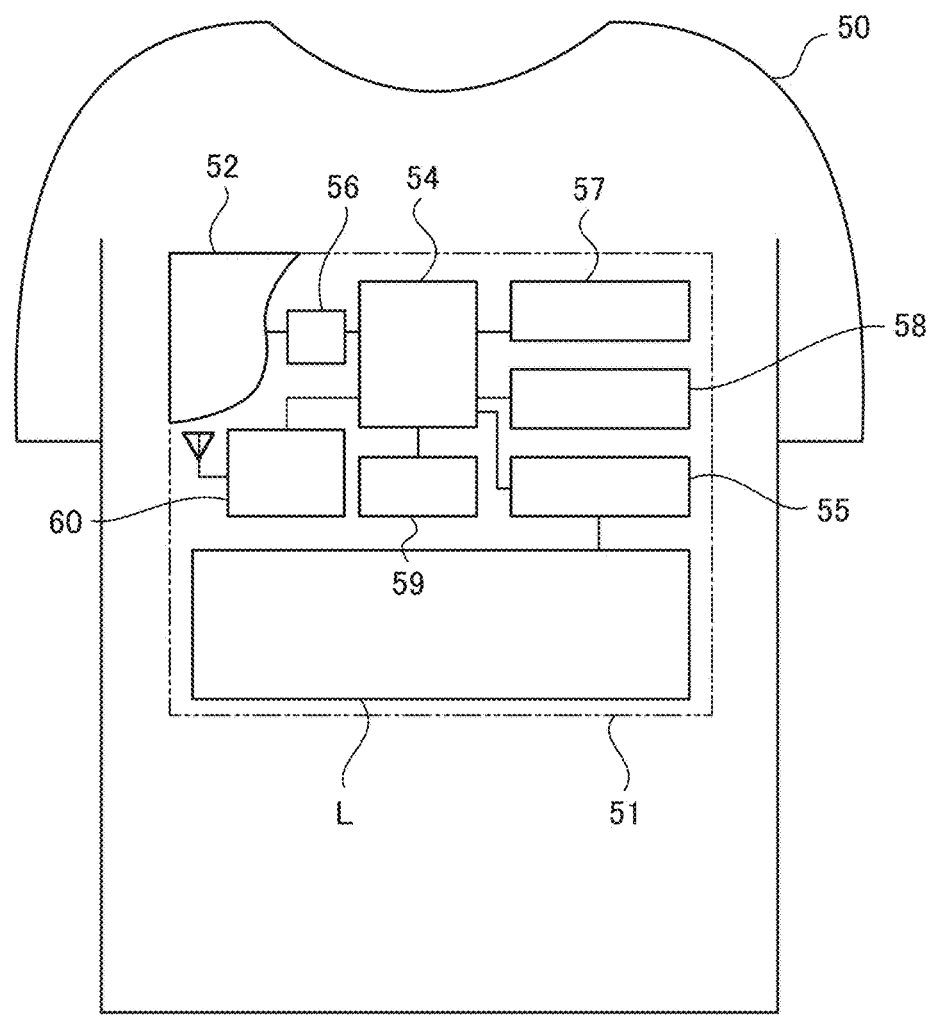
FIG. 13 is a block diagram illustrating the functional configuration of the clothing illustrated in FIG. 12.

FIG. 13 is a block diagram illustrating a schematic circuit configuration of the wearable device 51 in which the foregoing lithium ion cell L is mounted. In the figure, reference numeral 54 denotes a control part including a CPU and the like for performing an overall control of the wearable terminal 51, reference numeral 55 denotes a power supply control part for controlling power supply and charging of the foregoing lithium ion cell L, reference numeral 56 denotes a display control part for performing a display control of the display part 52, reference numeral 57 denotes various kinds of sensors such as a pulse sensor for measuring the pulse of a user wearing the clothing 50, an acceleration sensor, and the like, reference numeral 58 denotes an operating part for receiving various inputs, reference numeral 59 denotes a memory part for temporarily and non-temporarily storing a variety of data, and reference numeral 60 denotes a communication part for performing communication with a mobile communication network or a wireless LAN.

The wearable terminal 51 is flexible as a whole since components constituting this wearable terminal 51 and the like are flexible. Furthermore, the foregoing lithium ion cell L mounted in the wearable terminal 51 is capable of continuously maintaining sufficient charging and discharging characteristics even when the foregoing lithium ion cell L is bent. Thus, the wearable terminal 51 can be continuously used even when this wearable terminal 51 is bent. This enables the use of the wearable terminal 51 while being attached to the clothing 50.

In addition, as illustrated in FIG. 12, the wearable terminal 51 is capable of displaying, on the display part 52, a moving pattern (in the figure, a heart mark is displayed) or a pattern that changes. Furthermore, the wearable terminal 51 is capable of displaying measurement results obtained by the various kinds of sensors 57 and results of examinations performed based on these measurement results.

Figure 14:
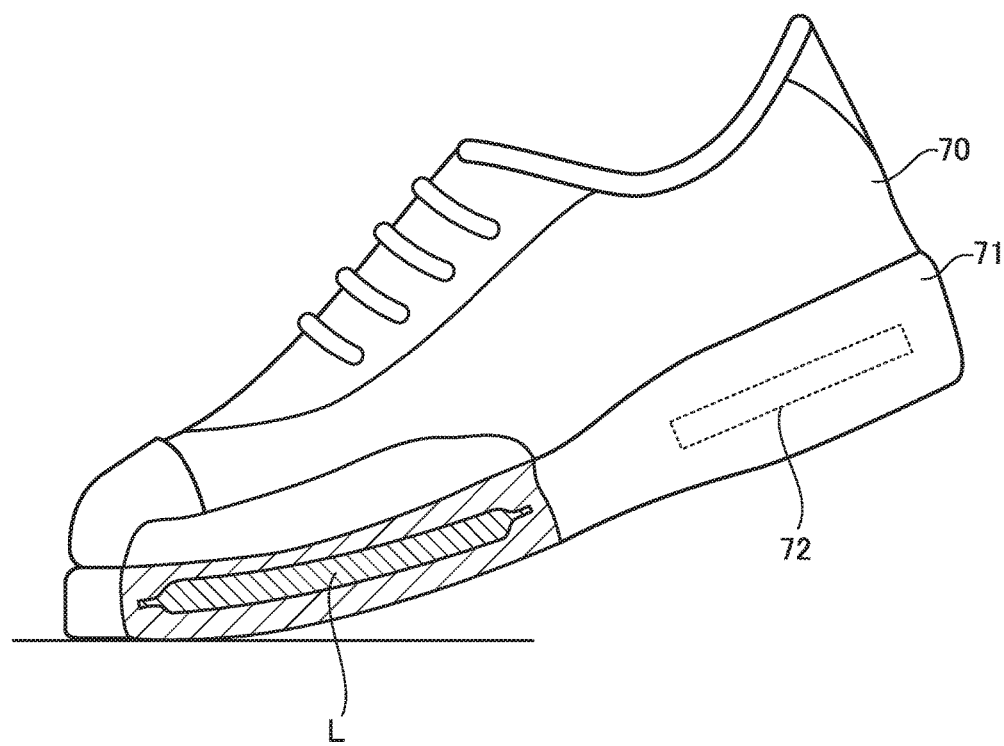
FIG. 14 is a partial cutaway perspective view of a shoe in which the lithium ion cell according to the first embodiment is mounted.

Next, another application example, in which the lithium ion cell L according to the first embodiment of the present invention is mounted, is described with reference to FIG. 14 and FIG. 15. FIG. 14 is a partial cutaway perspective view of a shoe in which the foregoing lithium ion cell L is mounted, and FIG. 15 is a block diagram illustrating a functional configuration of the shoe illustrated in FIG. 14.

In these figures, reference numeral 70 denotes a shoe in which the lithium ion cell L according to the first embodiment is mounted, and the foregoing lithium ion cell L and a board 72 are embedded inside a sole 71, which is formed at the bottom of the shoe 70. The foregoing lithium ion cell L and the board 72 are both formed of flexible members, and the shoe illustrated in these figures is configured to be flexible as a whole. As illustrated in FIG. 14, the foregoing lithium ion cell L is disposed at a front part of the sole 71 (left side part in FIG. 14), and the board 72 is disposed at a rear part of the sole (right side part in FIG. 14).

Figure 15:
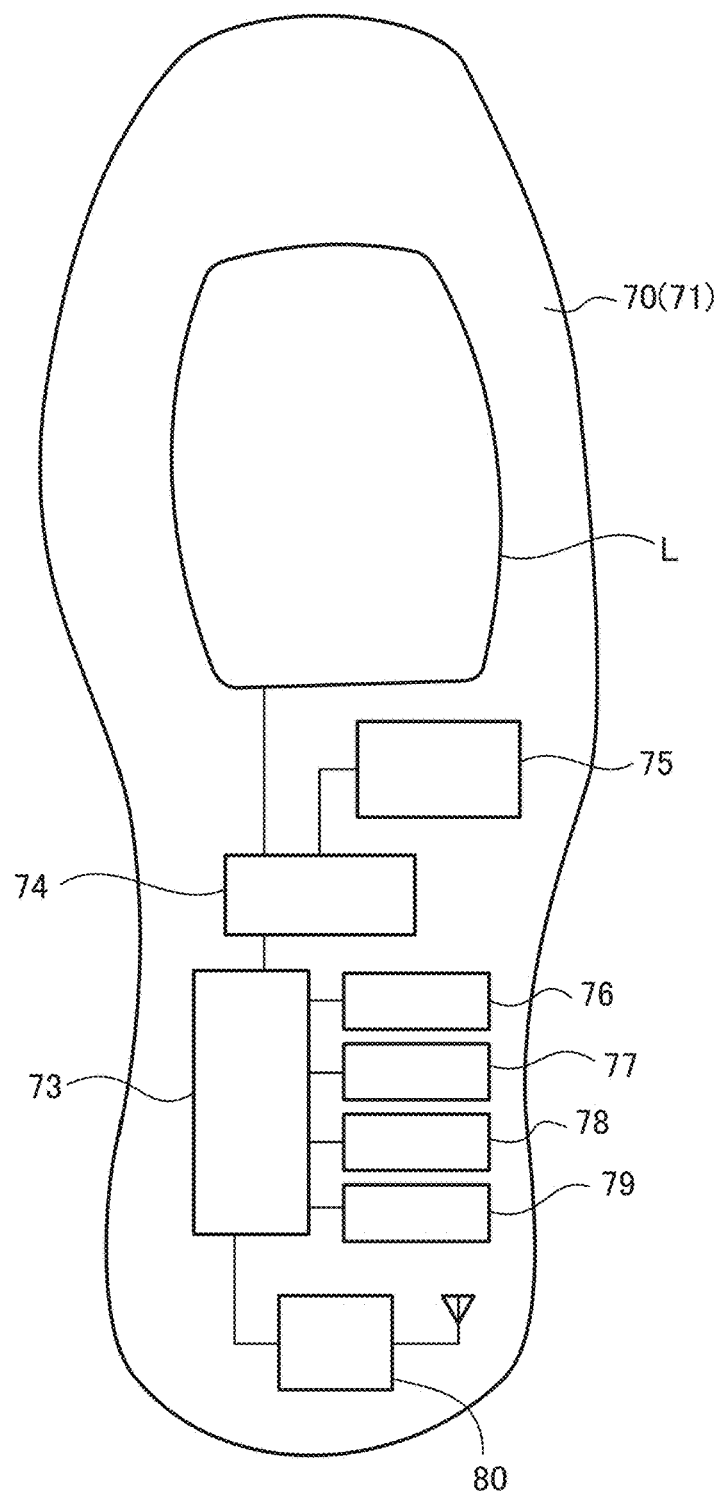
FIG. 15 is a block diagram illustrating the functional configuration of the shoe illustrated in FIG. 14.

FIG. 15 is a block diagram illustrating a schematic circuit configuration of the shoe 70. In the figure, reference numeral 73 is a control part including a CPU and the like for performing an overall control of the shoe 70, reference numeral 74 denotes a power supply control part for controlling power supply and charging of the foregoing lithium ion cell L, reference numeral 75 denotes a power source including a piezoelectric element and the like, reference numeral 76 denotes various kinds of sensors such as acceleration sensor, a gyrocompass, and the like, reference numeral 77 denotes a display part including a light emitting element and the like such as an LED and the like, reference numeral 78 denotes an operating part for receiving various kinds of input, reference numeral 79 denotes a memory part for temporarily and non-temporarily storing a variety of data, and reference numeral 80 denotes a communication part for communicating with a mobile communication network or performing near field communication such as a wireless LAN, Bluetooth (Registered trademark), and the like.

Accordingly, in the shoe 70, components embedded in the sole 71 and the like are flexible. Furthermore, the foregoing lithium ion cell L embedded in the sole 71 is capable of continuously maintaining sufficient charging and discharging characteristics even when the foregoing lithium ion cell L is bent. Thus, the continuous use is possible even when the sole 71 is bent. This enables the achievement of the shoe 70, to which the functionality of the wearable terminal is added.

In other words, with the shoe 70, the number of steps taken by a user wearing (putting on) the shoe 70, the status of exercise such as a pattern of step movement and the like, and calorie consumption and the like may be recorded and/or subjected to like processing. For example, in dancing or playing tennis or the like, a user can compare his or her steps or step movement with that of a professional player by checking them with a communication terminal such as a smartphone and the like.

Next, a modified example of the lithium ion cell L' according to the second embodiment is described with reference to FIG. 22 to FIG. 25B.

Figure 22:
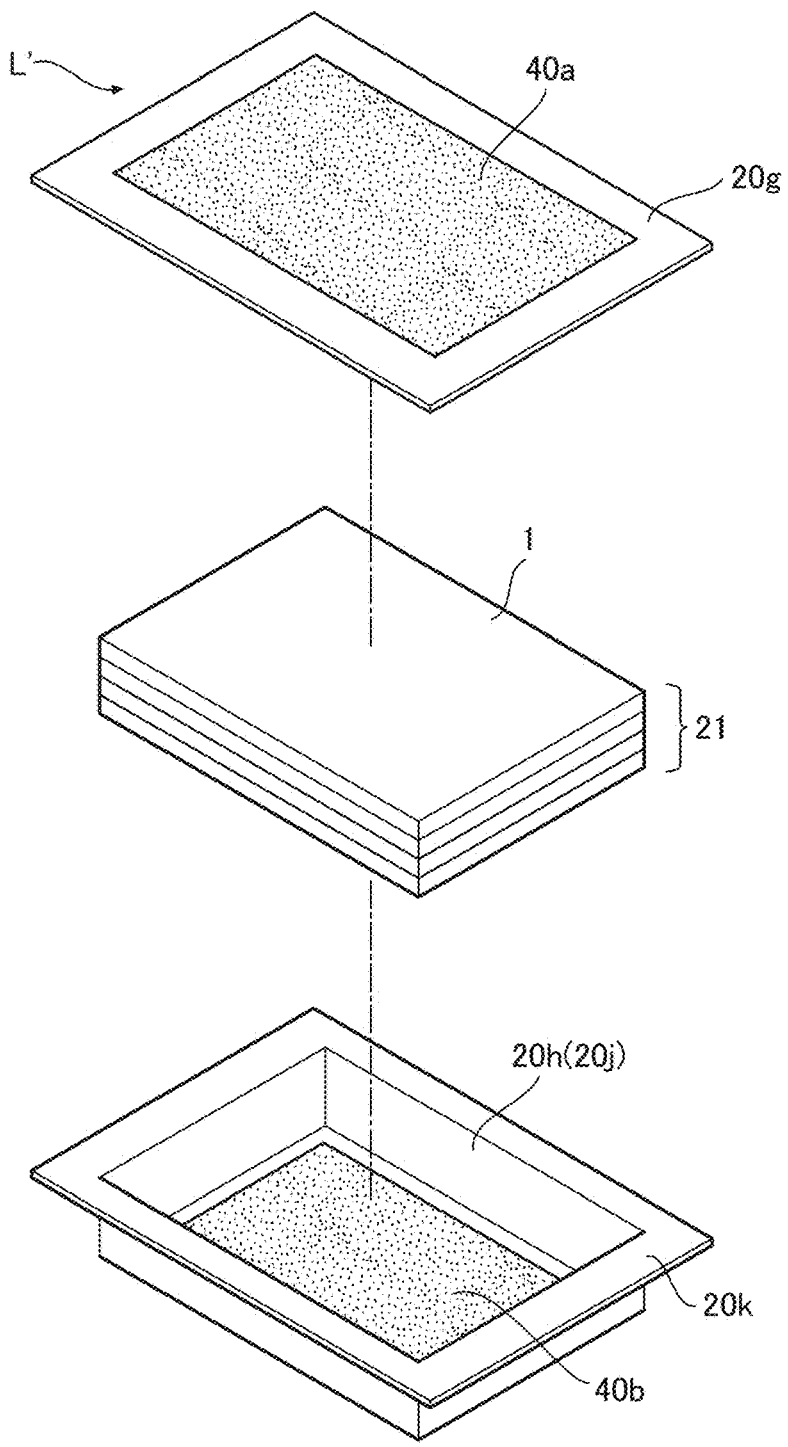
FIG. 22 is an exploded view of a lithium ion cell which is a variation example of the lithium ion cell according to the second embodiment of the present invention.
Figure 23A:
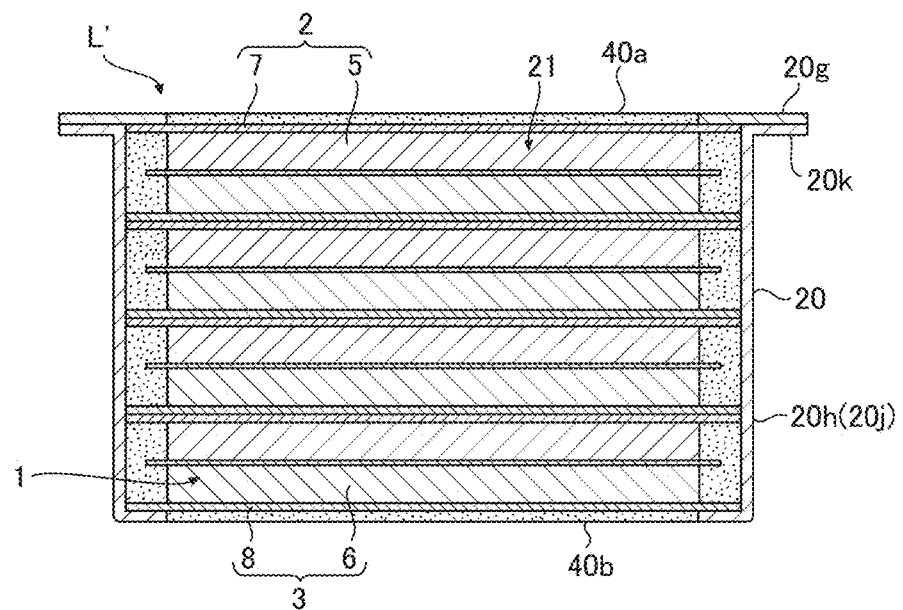
FIG. 23A is a cross-sectional view of the lithium ion cell illustrated in FIG. 22.
Figure 23B:
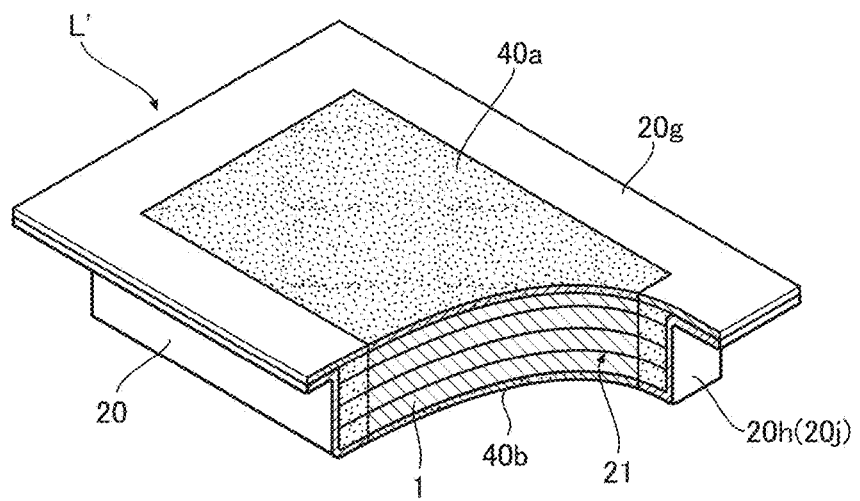
FIG. 23B is a partial cutaway perspective view of the lithium ion cell illustrated in FIG. 23A.
Figure 24A:
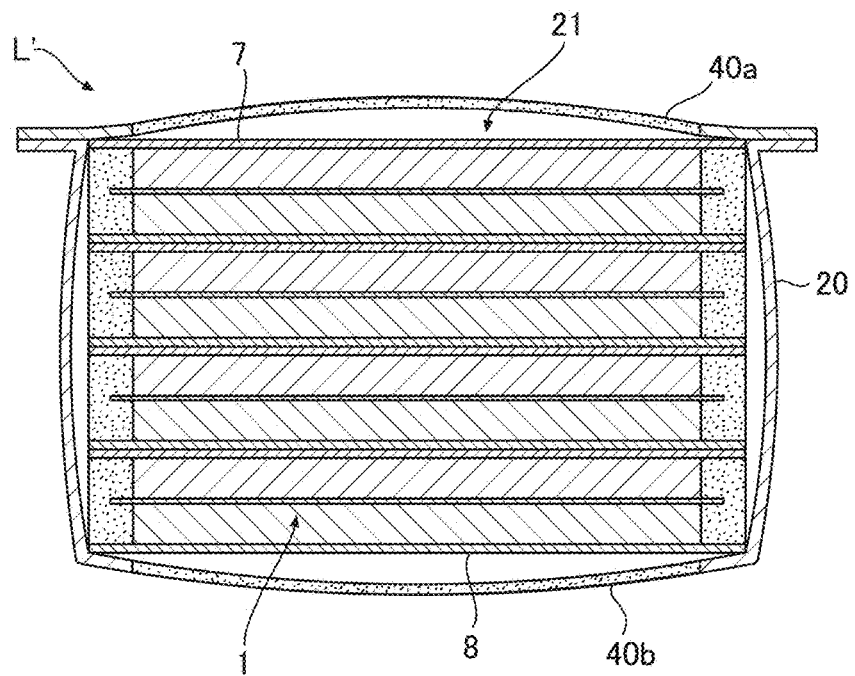
FIG. 24A is a cross-sectional view illustrating the lithium ion cell illustrated in FIG. 23 in operating state.
Figure 24B:
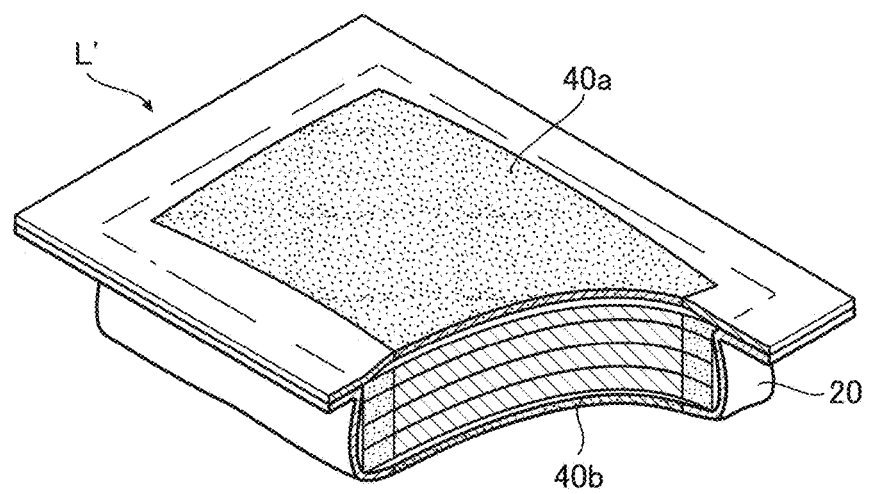
FIG. 24B is a partial cutaway perspective view of the lithium ion cell illustrated in FIG. 24A.
Figure 25A:
FIG. 25A is a cross-sectional view illustrating an exemplary structure of the current drawing part of the lithium ion cell illustrated in FIG. 22.
Figure 25B:
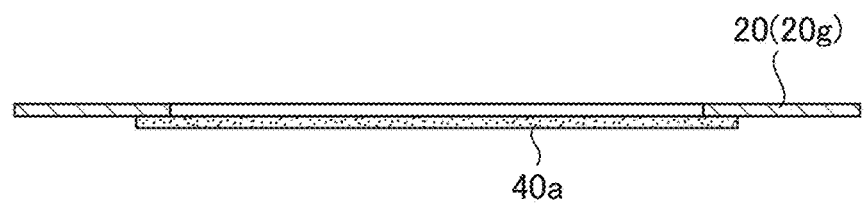
FIG. 25B is a cross-sectional view illustrating a variation example of the current drawing part of the lithium ion cell illustrated in FIG. 22.

FIG. 22 is an exploded view of a lithium ion cell that serves as a modified example of the lithium ion cell according to the second embodiment of the present invention. FIG. 23A is a cross-sectional view of the lithium ion cell illustrated in FIG. 22. FIG. 23B is a partial cutaway perspective view of the lithium ion cell illustrated in FIG. 23A. FIG. 24A is a cross-sectional view illustrating an operating state of the lithium ion cell illustrated in FIG. 23A and FIG. 23B. FIG. 24B is a partial cutaway perspective view of the lithium ion cell illustrated in FIG. 24A. FIG. 25A is a cross-sectional view illustrating an exemplary structure of a current extraction part of the lithium ion cell illustrated in FIG. 22. FIG. 25B is a cross-sectional view illustrating a modified example of the current extraction part of the lithium ion cell illustrated in FIG. 22.

A container 20 constituting the modified example of the lithium ion cell L' according to the second embodiment of the present invention includes, as best illustrated in FIG. 22, a top container 20g and a bottom container 20h that are separated from each other. The bottom container 20h includes a bottom container main body 20j that is formed in a substantially hollow box-like shape with an open top, and a bottom container frame part 20k that is formed in a substantially rectangular picture frame-like shape and disposed on an upper peripheral part of the bottom container main body 20j. On the other hand, the top container 20g is formed in a substantially rectangular plate-like shape having substantially the same size as the bottom container frame part 20k of the bottom container 20h, and is arranged so as to cover the opening of the bottom container main body 20j of the bottom container 20h.

Inside the bottom container main body 20j, a multilayer power generation part 21 is housed. Subsequently, the top container 20g and the bottom container 20h are hermetically joined by use of sealing member, which is omitted from the figure, while the inside of the bottom container main body 20j being depressurized. This completes the formation of the lithium ion cell.

Here, a current extraction part 40a and a current extraction part 40b are formed on the top container 20g and a bottom surface of the bottom container main body 20j in FIG. 22 and FIG. 23A, respectively. The current extraction part 40a and the current extraction part 40b are formed in rectangular plate-like shapes and are flexible and electrically conductive. The shapes of the current extraction part 40a and the current extraction part 40b are substantially the same as those of a positive electrode current collector 7 and a negative electrode current collector 8 of single cells 1 arranged at an uppermost part and a lowermost part of the multilayer power generation part 21, respectively. Here, the multilayer power generation part 21 is housed inside the container 20 after being depressurized and hermetically sealed. Thus, as best illustrated in FIG. 23A, a top surface of the positive electrode current collector 7 and a bottom surface of the negative electrode current collector 8 of the single cells 1, which are arranged at the uppermost part and the lowermost part of the multilayer power generation part 21, are electrically connected to the current extraction part 40a and the current extraction part 40b by being in close contact therewith.

There is no particular limitation on materials forming the current extraction part 40a and the current extraction part 40b as long as the materials are flexible and electrically conductive. For example, as illustrated in FIG. 25A, the current extraction part 40 may be formed by introducing an electrically conductive material into gaps formed inside the container 20 made of non-woven fabric and the like and by making part of the container 20 electrically conductive. Alternatively, as illustrated in FIG. 25B, an opening may be formed in the container 20 made of a laminated film, and the current extraction part 40a that is a flexible electrically conductive plate may be attached thereto.

In the lithium ion cell having such configuration, end portions of electrode terminals are fixed on a top surface and a bottom surface of the current extraction part 40a and the current extraction part 40b. For example, the electrode terminals, which are omitted in the figures, are formed in strip-like shapes, made of a metal foil, and fixed by using an electrically conductive adhesive agent. A power supply voltage from this lithium ion cell is supplied to the outside by connecting these electric power terminals to the multilayer power generation part 21.

In the lithium ion cell, sometimes a problem, such as an internal short circuit, may occur inside the lithium ion cell, and one of single cells 1 may produce a minute amount of gas over the lapse of time. As a result, the inner pressure of the container 20 including the current extraction part 40a and the current extraction part 40b increases to or more than atmospheric pressure.

In the case that the inner pressure of the container 20 increases to or more than the atmospheric pressure in the lithium ion cell having the configuration illustrated in FIG. 22 to FIG. 23B, the current extraction part 40a and the current extraction part 40b as well as the container 20 inflate outward as illustrated in FIG. 24A and FIG. 24B because flexible materials are used for the current extraction part 40a, the current extraction part 40b, and the container 20. As a result, the current extraction part 40a and the current extraction part 40b are at least partially separated from the top surface and the bottom surface of the positive electrode current collector 7 and the negative electrode current collector 8 of the single cells 1 arranged at the uppermost part and the lowermost part of the multilayer power generation part 21. This causes a decrease in contact area between the current extraction part 40a and the current extraction part 40b and the positive electrode current collector 7 and the negative electrode current collector 8, thereby increasing the electrical resistance between the current extraction part and the current collector. In this way, the current flowing into the single cells 1 may be reduced or preferably cut off.

Accordingly, the lithium ion cell illustrated in FIG. 22 to FIG. 23B enables the achievement of the lithium ion cell capable of cutting off the current when a problem occurs at the inside by adopting a simple configuration where the current extraction part 40a and the current extraction part 40b are formed on the container 20.

Particularly, in the case that a resin current collector is used for the positive electrode current collector 7 and the negative electrode current collector 8 of the single cell 1, electrical conductivity of the resin current collector is not high compared with the metal current collector. Thus, in view of extraction efficiency of power supply voltage and the like, in order to extract the power supply voltage from the multilayer power generation part 21 to the outside of the lithium ion cell, the current extraction part 40a and the current extraction part 40b serving as the power supply voltage extraction parts formed on the container 20 side preferably have larger areas, and more preferably have substantially the same areas as those of the positive electrode current collector 7 and the negative electrode current collector 8.

EXAMPLES

Comparison of the effect of the present invention is made by using Examples and Comparative Examples given below. However, it is evident that the technical scope of the present invention is not limited to Examples and Comparative Examples given below. Furthermore, hereinbelow, the operations were performed at room temperature (25° C.), unless described specifically otherwise. Furthermore, unless described specifically otherwise, parts means parts by weight and % means % by weight.

Production Example 1: Preparation of Resin Solution for Coating

To a four-necked flask equipped with a stirrer, a thermometer, a reflux condenser, a dropping funnel, and an inlet for introducing nitrogen gas, 70 parts of N,N-dimethyl formamide (hereinbelow, abbreviated as DMF) were injected and the temperature was raised to 75° C. Subsequently, a monomer blend in which 40 parts of 2-ethylhexyl methacrylic acid, 45 parts of methacrylic acid, 15 parts of methyl methacrylic acid, 0.1 part of lithium styrene sulfonic acid, and 20 parts of DMF are blended and an initiator solution having 0.6 parts of 2,2'-azobis(2,4-dimethylvaleronitrile) and 1.2 parts of 2,2'-azobis(2-methylbutyronitrile) dissolved in 10 parts of DMF were added dropwise, under stirring and flushing the inside of the 4-necked flask with nitrogen, continuously over 2 hours using a dropping funnel for carrying out the radical polymerization. Once the dropwise addition is completed, temperature was raised to 80° C. and the reaction was continued for 5 hours to obtain a copolymer solution with resin concentration of 50%. To the copolymer solution, 133.3 pars of DMF were added, and according to cooling to room temperature, a resin solution for coating with resin concentration of 30% by weight was obtained.

Production Example 2: Production of Coated Positive Electrode Active Material Particle 96 Parts of $LiNi_{0.8}Co_{0.15}Al_{0.05}O_2$ powder were added to a universal mixer, and in a state with stirring at 150 rpm at room temperature, the resin solution for coating obtained from Production Example 1, which has been weighed to have resin solid content of 2 parts (resin concentration of 30% by weight), was added dropwise over 60 minutes and stirred further for 30 minutes.

Subsequently, in a stirred state, 2 parts of acetylene black [trade name: "Denka Black (registered trademark) HS-100", manufactured by Denka Company Limited, average particle diameter of primary particle: 36 nm] were blended in three divided portions, and after stirring for 30 minutes, the temperature was raised to 70° C., and by reducing the pressure to 0.01 MPa and maintaining it under the reduced pressure for 30 minutes, a coated positive electrode active material particle was obtained.

Production Example 3: Production of Coated Negative Electrode Active Material Particle 90 Parts of non-graphitizable carbon [trade name: "Carbotron (registered trademark) PS(F)", manufactured by Kureha Battery Materials Japan Co., Ltd.] were added to a universal mixer, and in a state with stirring at 150 rpm at room temperature, the resin solution for coating obtained from Production Example 1, which has been weighed to have resin solid content of 5 parts (resin concentration of 30% by weight), was added dropwise over 60 minutes and stirred further for 30 minutes.

Subsequently, in a stirred state, 5 parts of acetylene black [trade name: "Denka Black HS-100" ] were blended in three divided portions, and after stirring for 30 minutes, the temperature was raised to 70° C., and by reducing the pressure to 0.01 MPa and maintaining it under the reduced pressure for 30 minutes, a coated negative electrode active material particle was obtained.

Production Example 4: Preparation of Electrolyte Solution

To a mixture solvent of ethylene carbonate (EC) and propylene carbonate (PC) (volume ratio of 1:1), 0.5% by weight of 1,3-propane sultone (PS) was added. By dissolving $LiPF_6$ at a ratio of 1 mol/L, an electrolyte solution for lithium ion cell was prepared.

Production Example 5: Production of Resin Current Collector

The current collector used in Examples was produced as described below.

Production Example 5-1: Production of Current Collector Having Electrically Conductive Resin Layer (Current Collector 1)

By using a biaxial extruder, 75% by weight of polypropylene (PP) [trade name: "SunAllomer (registered trademark) PL500A", manufactured by SunAllomer Ltd.], 20% by weight of acetylene black [trade name: "Denka Black HS-100" ], and 5% by weight of a resin modifying agent [trade name: "UMEX (registered trademark) 1001", manufactured by Sanyo Chemical Industries, Ltd.] were melt-kneaded at conditions including 180° C., 100 rpm, and retention time of 10 minutes, and thus a material for current collector was obtained. Furthermore, the amount of each component described above indicates a mixing ratio, and the polypropylene, acetylene black and resin modifying agent are 100% by weight in total. The obtained material for current collector was rolled using a heat press machine to obtain the current collector 1 with thickness of 100 µm.

Production Example 5-2: Production of Positive Electrode Current Collector Having Electrically Conductive Layer (Current Collector 1-1)

By mixing 7 parts of a liquid phase epoxy resin [trade name: "CELLOXIDE (registered trademark) 2021P", manufactured by Daicel Corporation, alicyclic epoxy resin], 15 parts of polyfunctional epoxy resin [trade name: "MARPROOF (registered trademark) G2050M", manufactured by NOF CORPORATION], 75 parts of methyl ethyl ketone, 3 part of acetylene black (trade name: "Denka Black HS-100"), and 0.5 parts of a curing agent for epoxy resin (trade name: "SAN AID SI-60", manufactured by SAN-SHIN CHEMICAL INDUSTRY CO., LTD.), an ink 1 for electrically conductive member for forming a polymer material-containing electrically conductive member was prepared.

To both surfaces of the current collector 1 which has been prepared in Production Example 5-1, the ink 1 for an electrically conductive member was coated by using an applicator with gap of 30 µm. Subsequently, according to vacuum drying at 110° C. for 3 hours, the solvent was removed and curing was performed to obtain the current collector 1-1 having the electrically conductive layer (the first electrically conductive layer and the third electrically conductive layer), which is composed of an electrically conductive member containing a polymer material consisting of acetylene black and an epoxy resin and fixed on both surfaces of the current collector 1.

Production Example 5-3: Production of Negative Electrode Current Collector Having Electrically Conductive Layer on Outermost Surface (Current Collector 1-2)

By mixing 7 parts of a liquid phase epoxy resin [trade name: "CELLOXIDE (registered trademark) 2021P" ], 15 parts of polyfunctional epoxy resin [trade name: "MARPROOF (registered trademark) G2050M" ], 75 parts of methyl ethyl ketone, 3 parts of a nickel filler (trade name: "T255", manufactured by Nikko Rika Corporation, standard particle diameter of primary particle: 2.2 to 2.8 µm), and 0.5 parts of a curing agent (trade name: "SAN AID SI-60"), an ink 2 for electrically conductive member for forming a polymer material-containing electrically conductive member was prepared.

To a single surface of the current collector 1-1 which has been prepared in Production Example 5-2, the ink 2 for an electrically conductive member was coated by using an applicator with gap of 30 μm. Subsequently, according to vacuum drying at 110° C. for 3 hours, the solvent was removed and curing was performed to obtain the current collector 1-2 having the second electrically conductive layer, which is composed of an electrically conductive member containing a polymer material consisting of nickel filler and an epoxy resin and fixed on a single surface of the current collector 1-1.

Production Example 6: Preparation of Carbon Fiber

The carbon fiber was prepared in view of the method described in Eiichi Yasuda, Asao Oya, Shinya Komura, Shigeki Tomonoh, Takashi Nishizawa, Shinsuke Nagata, Takashi Akatsu, CARBON, 50, 2012, 1432-1434 and Eiichi Yasuda, Takashi Akatsu, Yasuhiro Tanabe, Kazumasa Nakamura, Yasuto Hoshikawa, and Naoya Miyajima, TANSO, 255, 2012, pages 254 to 265.

10 Parts of synthetic mesophase as carbon precursor (trade name: "MESOPHASE PITCH AR/MPH", manufactured by MITSUBISHI GAS CHEMICAL COMPANY, INC) and 90 parts of polymethylpentene (trade name: "TPX RT18", manufactured by Mitsui Chemicals, Inc) were melt-kneaded using a monoaxial extruder under nitrogen atmosphere at barrel temperature of 310° C. to produce a resin composition.

The above resin composition was subjected to melt spinning extrusion at 390° C. The extruded resin composition was added to an electric furnace, and by keeping it for 3 hours under nitrogen atmosphere at temperature of 270° C., the carbon precursor was stabilized. Subsequently, the electric furnace was heated to 500° C. over 1 hour and maintained at 500° C. for 1 hour, and then polymethyl pentene was decomposed and removed. The electric furnace was heated to 1000° C. over 2 hours and kept for 30 minutes at 1000° C. The remaining stabilized carbon precursor was used as electrically conductive fiber.

90 Parts of the obtained electrically conductive fiber, 500 parts of water, and 1000 parts of zirconia ball with Φ of 0.1 mm were added to a pot mill and pulverized for 5 minutes. After classifying the zirconia balls, the resultant was dried at 100° C. to obtain carbon fiber. Based on the measurement result using a scanning electron microscope, the average fiber diameter was found to be 0.3 μm and the average fiber length was found to be 26 μm.

Production Example 7: Production of Positive Electrode

After mixing 98 parts of the coated positive electrode active material particle obtained in Production Example 2, 2 parts of the carbon fiber obtained in Production Example 6, and 70 parts of the electrolyte solution obtained in Production Example 4, they were further kneaded for 5 minutes at 2000 rpm using a rotation and revolution mixer (manufactured by THINKY Corporation, Awatari Rentaro) to prepare a coated positive electrode active material composition. Then, on top of aramid nonwoven fabric with length of 100 mm× and width of 100 mm (Model No. 2486R, manufactured by Japan Vielene Company [thickness of 20 μm]), a mask with length of 50 mm× and width of 50 mm having an opening part was overlaid, and the above coated positive electrode active material composition was coated within the opening part using a squeegee to form a coated positive electrode active material layer with length of 50 mm× and width of 50 mm, and thickness of about 1 mm.

On the above layer, aramid nonwoven fabric for liquid absorption was overlaid from the top, and after sandwiching it between smooth SUS sheets, it was rolled using a press machine to have gap ratio of 45%. Thereafter, the aramid nonwoven fabric for liquid absorption was peeled off and a positive electrode for a lithium ion secondary cell, which is a coated positive electrode active material layer, was obtained. Thickness of the positive electrode formed on the aramid nonwoven fabric was 600 μm.

The gap ratio was calculated from the volume of the coated positive electrode active material layer after pressing and the volume (calculated from weight and specific gravity of each solid material) of solid materials included in the coated positive electrode active material layer (positive electrode active material particle, resin for coating, conductive aid, or the like).

Production Example 8: Production of Negative Electrode

After mixing 98 parts of the coated negative electrode active material particle obtained in Production Example 3, 2 parts of the carbon fiber obtained in Production Example 6, and 150 parts of the electrolyte solution obtained in Production Example 4, they were further kneaded in the same manner as the production of the above positive electrode to prepare a coated negative electrode active material composition. Then, on top of aramid nonwoven fabric with length of 100 mm× and width of 100 mm, a mask with length of 55 mm× and width of 55 mm having an opening part was overlaid, and the above coated negative electrode active material composition was coated within the opening part using a squeegee to form a coated negative electrode active material layer with length of 55 mm× and width of 55 mm, and thickness of about 1 mm.

By performing the pressing to have gap ratio of 45% in the same manner as the above positive electrode, a negative electrode for a lithium ion secondary cell, which is a coated negative electrode active material layer, was obtained. Thickness of the negative electrode formed on top of the aramid nonwoven fabric was 700 μm. Furthermore, the gap ratio was obtained in the same manner as the positive electrode.

Comparative Production Example 1: Production of Positive Electrode for Cell of Conventional Type as Comparative Example 90 Parts of $LiNi_{0.8}Co_{0.15}Al_{0.05}O_2$ powder, 10 parts of acetylene black [trade name: "Denka Black HS-100" ], 5 parts of polyvinylidene fluoride [manufactured by Sigma Aldrich], and 30 parts of N-methyl pyrrolidone were added and sufficiently mixed using a pestle and mortar to give a comparative positive electrode active material composition. The obtained comparative positive electrode active material composition was coated on a single surface of an electrolyzed aluminum foil with thickness of 20 μm followed by drying for 15 minutes at 100° C. It was further dried for 8 hours at 80° C. under reduced pressure (1.3 kPa) to produce a comparative positive electrode. Thickness of the electrode after drying was 620 μm including the aluminum foil.

Comparative Production Example 2: Production of Negative Electrode for Cell of Conventional Type as Comparative Example 90 Parts of graphite powder [manufactured by Nippon Graphite Industries], 5 parts of acetylene black [trade name:

"Denka Black HS-100"], 2.5 parts of sodium carboxymethyl cellulose [trade name: "Cello Gen (registered trademark) F-BSH4", manufactured by Daiichi Kogyo K.K.], 6.25 parts of SBR (styrene-butadiene rubber) emulsion (manufactured by JSR Corporation, resin concentration of 40% by weight), and 30 parts of water were added and sufficiently mixed in a planetary mill to give a comparative negative electrode active material composition. The obtained comparative negative electrode active material composition was coated on a single surface of a copper foil with thickness of 20 μm followed by drying for 3 hours at 80° C. and atmospheric pressure. It was further vacuum dried for 8 hours at 80° C. to evaporate the solvent, and thus a comparative negative electrode was produced. Thickness of the electrode after drying was 720 μm including the copper foil.

Example 1 and Comparative Example 1

(Production of Lithium Ion Cell of the Present Invention and Comparative Cell)

By combining each of the electrode for lithium ion secondary cell obtained in Production Example 7 and Production Example 8, and each of the comparative electrode obtained in Comparative Production Example 1 and Comparative Production Example 2 and using the method described below, the lithium ion cell of the present invention and a comparative cell were produced.

On an electrolyzed copper foil with length of 70 mm×width of 70 mm, which is connected with a tab for drawing electric current and disposed on a laminated aluminum sheet with length of 120 mm×width of 120 mm, the current collector 1-2 Which has been obtained in Production Example 5-3 and cut to a size with length of 60 mm×width of 60 mm, a negative electrode for lithium ion secondary cell or a comparative negative electrode, a separator made of PP with length of 80 mm×width of 80 mm [trade name: "CELLGARD (registered trademark) 2500", manufactured by CELLGARD], a positive electrode for lithium ion secondary cell or a comparative positive electrode, and the current collector 1-1 which has been obtained in Production Example 5-2 and cut to a size with length of 60 mm×width of 60 mm were stacked in the order such that the tab for drawing electric current is led to the outside of a square-shaped cell. Accordingly, a power generation part was produced. Furthermore, on top of the power generation part, a carbon coated aluminum foil with length of 70 mm×width of 70 mm to which a tab for drawing electric current is connected and a laminated aluminum film with length of 120 mm×width of 120 mm are stacked in the order. Meanwhile, for producing the power generation part, the electrolyte solution was injected several times (total amount of 1.2 parts) onto the negative electrode and the separator by using a dropper or the like.

After that, three sides of the laminated aluminum film present on top and bottom of the power generation part were heat-melted using a heat sealing device, and the remaining one side was heat-melted and sealed with vacuum degree of 99% using a vacuum sealing device (TOSPACK V-307GII, manufactured by TOSEI) to produce a lithium ion cell of the present invention and a comparative cell.

(Evaluation of Discharge Capacity of Lithium Ion Cell)

The lithium ion cell of the present invention which has been produced above was sandwiched between two pieces of a galvanized iron plate with thickness of about 1 mm, and then applied with pressure of 0.2 MPa. At room temperature, by using a charge and discharge measurement device "Battery Analyzer Type 1470" [manufactured by Toyo Technica K.K.], it was charged to voltage of 4.3 V at current of 0.05 C. After resting for 10 minutes, it was discharged to voltage of 2.5 V at current of 0.05 C to perform the first charge and discharge. Subsequently, the galvanized iron plates having the cell sandwiched therebetween were removed, and similar to the first charge and discharge, the cell was charged to voltage of 4.3 V. After resting for 10 minutes, it was discharged to voltage of 2.5 V, and the cell capacity at that time was measured. By dividing the cell capacity obtained from the lithium ion cell of the present invention by surface area of the positive electrode, the capacity per unit area (discharge capacity) was calculated, and it was found to be 20 mAh/cm$^2$. With regard to the comparative cell, the charge and discharge was performed in the same manner as the lithium ion cell of the present invention except that it is not sandwiched between galvanized iron plates. From the cell capacity at the second charge and discharge, the discharge capacity was calculated. The discharge capacity of the comparative cell was 4 mAh/cm$^2$.

(Flexibility Test of Lithium Ion Cell)

Each of the lithium ion cell of the present invention and comparative cell after measuring discharge capacity was wound around a cylindrical jig with diameter of 20 mm, which is based on a cylindrical jig described in JIS K5600-5-1: 1999, Part 5—Section 1, Bending resistance (cylindrical mandrel method). It was then returned to a flat shape, and this operation was repeated 10 times. Subsequently, the lithium ion cell of the present invention and comparative cell were bent simultaneously in 2 directions so as to have a cross-like bending mark. Then, an LED was connected thereto while maintaining the bent state. As a result, LED light was shown only from the lithium ion cell of the present invention and there was no light from the LED connected to the comparative cell.

The lithium ion cell of the present invention in Examples achieved higher discharge capacity than the lithium ion cell of Comparative Examples. Furthermore, the lithium ion cell of Examples exhibited a discharge even in a bent state. On the other hand, the lithium ion cell of Comparative Examples did not exhibit any discharge in a bent state. In this regard, it is believed that, as the active material layer contained in the single cell of the lithium ion cell of the present invention is a non-bound material, it has flexibility, and as the coating layer contained in the coated active material particle functions as a lubricating layer, the active material particles can move in response to the stress generated by bending while the electric contact between active materials is maintained. It is also believed that, in the lithium ion cell of the second embodiment in which a stacked power generating part having stacked single cells is included, the active material particles can move in response to the stress while maintaining the electric contact, and thus compared to a cell using a conventional type cell electrode, improved mechanical durability can be exhibited.

What is claimed is:
1. A lithium ion cell comprising:
a power generation part,
and an exterior cell container for accommodating the power generation part,
the power generation part comprising a flexible single cell,
the single cell comprising:
a positive electrode current collector,
a positive electrode active material layer stacked on the positive electrode current collector, the positive elec- trode active material layer being a non-bound material of a positive electrode active material particle, a separator stacked on the positive electrode active material layer, a negative electrode active material layer stacked on the separator, the negative electrode active material layer being a non-bound material of a negative electrode active material particle, and a negative electrode current collector stacked on the negative electrode active material layer.

2. The lithium ion cell according to claim 1, wherein the exterior cell container has flexibility.

3. The lithium ion cell according to claim 1, wherein the positive electrode current collector and the negative electrode current collector are each a current collector having an electrically conductive resin layer.

4. The lithium ion cell according to claim 1, wherein the thickness of the positive electrode active material layer and/or the negative electrode active material layer is 200 μm or more.

5. The lithium ion cell according to claim 1, wherein the positive electrode active material particle has a surface that is at least partially coated with a coating agent containing a conductive aid and a resin for coating, and the the negative electrode active material particle has a surface that is at least partially coated with a layer containing a conductive aid and a resin for coating.

6. The lithium ion cell according to claim 1, wherein the positive electrode active material layer and the negative electrode active material layer contain a fibrous electrically conductive filler.

7. The lithium ion cell according to claim 1, wherein the positive electrode current collector comprises:

a substrate, and a first electrically conductive layer disposed on a surface of the substrate to be stacked with the positive electrode active material layer, and the negative electrode current collector comprises:

a substrate, and a second electrically conductive layer disposed on a surface of the substrate to be stacked with the negative electrode active material layer.

8. The lithium ion cell according to claim 1, wherein the positive electrode current collector and/or the negative electrode current collector comprises: a substrate, and a third electrically conductive layer formed on a surface of the substrate which is provided on an outermost surface side of the power generation part.

9. The lithium ion cell according to claim 1, wherein the power generation part is a stacked power generating part in which two or more single cells are stacked.

10. The lithium ion cell according to claim 1, wherein the positive electrode active material particle has a volume average particle diameter of 0.1 to 100 μm, and the negative electrode active material particle has a volume average particle diameter of 0.01 to 100 μm.

11. The lithium ion cell according to claim 1, wherein the positive electrode active material layer and the negative electrode active material layer are deformable is response to an external force.

* * * * *